US010368287B2

(12) United States Patent
Cho et al.

(10) Patent No.: US 10,368,287 B2
(45) Date of Patent: Jul. 30, 2019

(54) METHOD AND APPARATUS FOR RESELECTING CELL IN WIRELESS COMMUNICATION SYSTEM

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/571,630

(22) PCT Filed: May 4, 2015

(86) PCT No.: PCT/KR2015/004472
§ 371 (c)(1),
(2) Date: Nov. 3, 2017

(87) PCT Pub. No.: WO2016/178440
PCT Pub. Date: Nov. 10, 2016

(65) Prior Publication Data
US 2018/0146410 A1    May 24, 2018

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0061* (2013.01); *H04W 48/20* (2013.01);
(Continued)

(58) Field of Classification Search
CPC . H04W 48/20; H04W 72/14; H04W 36/0061; H04W 36/32; H04W 72/1247;
(Continued)

(56) References Cited

U.S. PATENT DOCUMENTS

2009/0252124 A1* 10/2009 Yeo ................... H04W 72/1252
370/336
2010/0074214 A1*  3/2010 Yi ........................... H04L 47/10
370/329

(Continued)

FOREIGN PATENT DOCUMENTS

KR    10-2011-0101094 A    9/2011

*Primary Examiner* — Brian D Nguyen
(74) *Attorney, Agent, or Firm* — Birch, Stewart, Kolasch & Birch, LLP

(57) ABSTRACT

The present invention relates to a method and apparatus for selecting a cell in a wireless communication system supporting a low latency service. According to the present invention, provided are a method including: receiving a first control message including first scheduling delay information indicating a delay time related with resource allocation of a serving base station from the serving base station; transmitting a request message including an UL (uplink) resource request IE (information element) for requesting UL resource allocation to the serving base station or a neighboring base station; receiving a response message in response to the request message from the serving base station or the neighboring base station; and receiving the UL resource from the serving base station or the neighboring base station based on the request message, in which the UL resource request IE includes an UL grant offset field indicating an UL resource request time of the UE, and an apparatus.

15 Claims, 16 Drawing Sheets

(51) Int. Cl.
*H04W 48/12* (2009.01)
*H04W 48/20* (2009.01)
*H04W 72/14* (2009.01)
*H04W 72/12* (2009.01)

(52) U.S. Cl.
CPC ............ *H04W 72/14* (2013.01); *H04W 48/12* (2013.01); *H04W 72/1247* (2013.01)

(58) Field of Classification Search
CPC ..... H04W 48/12; Y02D 70/126; Y02D 70/24; Y02D 70/122
See application file for complete search history.

(56) References Cited

U.S. PATENT DOCUMENTS

| | | | |
|---|---|---|---|
| 2011/0032924 A1 | 2/2011 | Lee et al. | |
| 2011/0216739 A1* | 9/2011 | Lee ................... | H04W 36/00 370/331 |
| 2012/0195241 A1* | 8/2012 | Liu ................... | H04W 52/50 370/311 |
| 2012/0275438 A1* | 11/2012 | Dai ................... | H04W 72/1289 370/336 |
| 2013/0336301 A1* | 12/2013 | Deng ................ | H04W 72/1289 370/336 |
| 2014/0307598 A1 | 10/2014 | Mizusawa | |
| 2015/0124776 A1* | 5/2015 | Lee ................... | H04W 76/16 370/331 |

* cited by examiner (a)

(b)

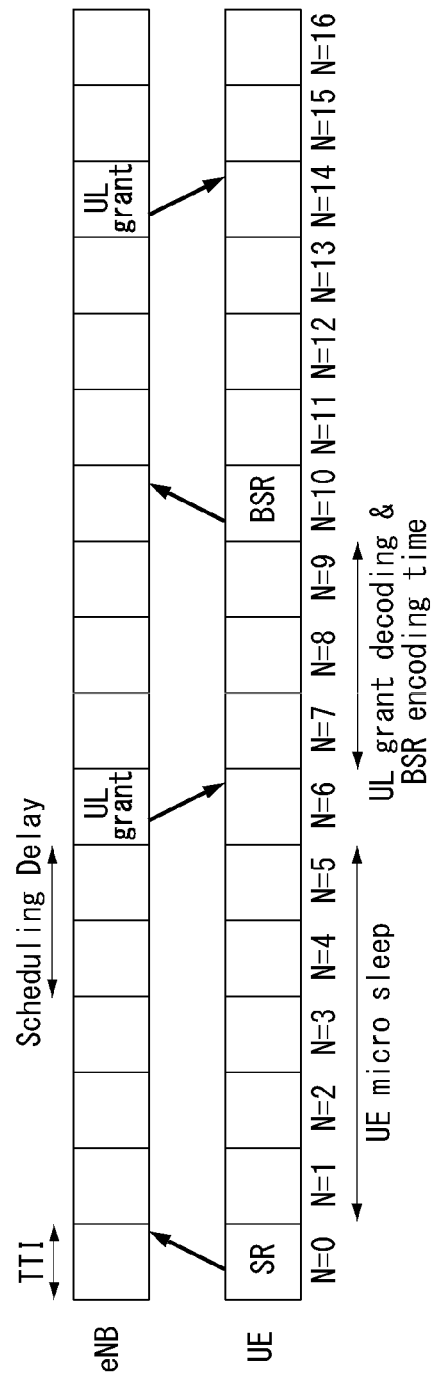

METHOD AND APPARATUS FOR RESELECTING CELL IN WIRELESS COMMUNICATION SYSTEM

CROSS REFERENCE TO RELATED APPLICATIONS

This application is the National Phase of PCT International Application No. PCT/KR2015/004472, filed on May 4, 2015, which is hereby expressly incorporated by reference into the present application.

TECHNICAL FIELD

The present invention relates to a wireless communication system, and more particularly, to a method for selecting/reselecting a cell in which a terminal can rapidly configure a wireless connection in an idle mode state and an apparatus for supporting the same.

BACKGROUND ART

Mobile communication systems have been developed to provide a voice service while ensuring mobility of users. The mobile communication system has evolved to provide a data service in addition to the voice service. These days, due to explosive growth of traffic, communication resources are easily running short. Also, since demand for higher speed services is great, needs for more advanced mobile communication systems are getting larger.

Requirements for the next-generation mobile communication system largely include accommodation of explosive data traffic, considerable increase of transmission rate for each user, accommodation of the significantly increased number of connected devices, very low end-to-end latency, and high energy efficiency. To meet the requirements, various technologies such as dual connectivity, massive multiple input multiple output (MIMO), in-band full duplex, non-orthogonal multiple access (NOMA), support for super-wideband communication, and device networking are being studied.

DISCLOSURE

Technical Problem

An object of the present invention is to provide a method for reselecting a cell in a wireless communication system.

Further, an object of the present invention is to provide a method for rapidly configuring an RRC connection by a UE providing a low latency service.

In addition, an object of the present invention is to provide a method for reselecting a cell by using scheduling delay information transmitted from a base station.

Moreover, an object of the present invention is to provide provides a method for reselecting a cell when a scheduling delay of a serving cell is larger than a maximum allowable delay.

Further, an object of the present invention is to provide a method for reselecting a cell by generating a cell candidate group using a cell ranking and the scheduling delay.

In addition, an object of the present invention is to provide a method for requesting an uplink resource by using predefined uplink resource allocation time information and the scheduling delay according to a capability type of the UE.

Moreover, an object of the present invention is to provide a method for reconfiguring the RRC connection by using the predefined uplink resource allocation time information and the scheduling delay according to the capability type of the UE.

The technical objects of the present invention are not limited to the aforementioned technical objects, and other technical objects, which are not mentioned above, will be apparently appreciated by a person having ordinary skill in the art from the following description.

Technical Solution

In order to solve the problem, the present invention provides a method and apparatus selecting a cell in a wireless communication system for supporting a low latency service.

Specifically, the method for selecting a cell includes: receiving a first control message including first scheduling delay information indicating a delay time related to resource allocation of a serving base station from the serving base station; performing a cell selection procedure; transmitting a request message including an UL (uplink) resource request IE (information element) for requesting UL resource allocation to the serving base station or a neighboring base station; receiving a response message in response to the request message from the serving base station or the neighboring base station; and receiving the UL resource from the serving base station or the neighboring base station based on the request message, in which the UL resource request IE includes an UL grant offset field indicating an UL resource request time of the UE.

Further, the first scheduling delay information includes at least one of downlink RRC response delay information indicating a message processing time and a delay time for the response message, UL scheduling delay information indicating the delay time for UL resource allocation, UL resource guarantee information indicating guarantee for the resource request time, or an available resource amount information.

In addition, when the UL resource is allocated from the serving base station, the UL resource is allocated after a time obtained by adding a value of the UL scheduling delay information and the value of the UL grant offset field elapsed from the time of receiving the response message.

Moreover, the first control message further includes a maximum allowable delay information indicating a maximum delay value allowed by the UE for RRC connection with the serving base station and the performing of the cell selecting procedure comprises receiving a second control message including second scheduling information indicating a delay time related to resource allocation of neighboring base stations from the neighboring base stations, when the serving base station satisfies a specific condition.

Further, the method further includes: measuring quality values of the neighboring base stations; determining rankings of the neighboring base stations based on the measured quality values; and determining some neighboring base stations among the neighboring base stations as a higher group based on the determined rankings.

In addition, the method further includes selecting the neighboring base station to be a next serving base station based on the second scheduling delay information and the rankings among the some neighboring base stations included in the higher group, and the second scheduling delay information includes a delay time with state transition from an idle mode to a connected mode.

Moreover, the specific condition is at least any one of a case where a signal strength of the serving base station is equal to or smaller than a threshold, a case where a signal quality of the base station is equal to or lower than a threshold, and a case where the first scheduling delay information is larger than the maximum allowable delay information.

Further, when the serving base station does not fulfill the specific condition, the serving base station is selected.

In addition, the quality value is at least one of the signal strength or the signal quality of the neighboring cells.

Moreover, the higher group includes a cell having the best ranking to a cell having a ranking value obtained by subtracting a specific offset value from the best ranking.

Further, the UL resource is allocated at a time obtained by adding the value of the second scheduling delay information and the value of the UL grant offset field.

In addition, the UL resource request IE further includes at least one of a cause field indicating a UL resource request for a low delay service, a UE capability type field indicating a capability of the UE accessing the serving base station, a UL grant size field indicating a size of data to be transmitted through the UL resource, or a device type field indicating a type of the UE.

Moreover, each of the first scheduling delay information and the second scheduling delay information varies depending on the type of the UE, a kind of the UE, or the capability of the UE.

Further, the UE is in a idle state from the time of receiving the response message up to the time of receiving the UL resource.

In addition, the present invention provides a method including: receiving a control message including scheduling delay information indicating a delay time related to resource allocation of a serving base station from the serving base station; transmitting an RRC Connection reestablishment request message including identification information of the UE to the base station based on the control message; receiving an RRC connection reestablishment message including information related to whether to allocate an UL resource in response to the RRC Connection reestablishment request message; receiving the UL resource from the base station; and transmitting an RRC connection reestablishment complete message to the base station through the allocated UL resource.

Further, the scheduling delay information includes at least one of downlink RRC response delay information indicating a message processing time and a delay time for the response message, UL scheduling delay information indicating a delay time for UL resource allocation, UL resource guarantee information indicating guarantee for the resource request time, or an available resource amount information.

Moreover, the information related to whether to allocate the UL resource indicates whether to allocate the UL resource by using an unsolicited method.

In addition, the UE is in a idle state from the time of receiving the response message up to the time of receiving the RRC connection reestablishment message.

Moreover, the present invention provides a UE including: a communication unit transmitting and receiving a radio signal to and from the outside; and a processor functionally coupled with the communication unit, in which the processor controls to receive a first control message including first scheduling delay information indicating a delay time related to resource allocation of a serving base station from the serving base station, perform a cell selection procedure, transmit a request message including an UL resource request information element (IE) for requesting UL resource allocation to the serving base station or a neighboring base station, receive a response message in response to the request message from the serving base station or the neighboring base station, and receive the UL resource from the serving base station or the neighboring base station based on the request message, and the UL resource request information element (IE) includes an UL grant offset field indicating an UL resource request time of the UE.

In addition, the present invention provides a UE including: a communication unit transmitting and receiving a radio signal to and from the outside; and a processor functionally coupled with the communication unit, in which the processor controls to receive a control message including scheduling delay information indicating a delay time related to resource allocation of a serving base station from the serving base station, transmit an RRC Connection reestablishment request message including identification information of the UE to the base station based on the control message, receive an RRC connection reestablishment message including information related to whether to allocate an UL resource in response to the RRC Connection reestablishment request message, and receive the UL resource from the base station, and the UE transmits an RRC connection reestablishment complete message to the base station through the allocated UL resource.

Advantageous Effects

According to the present invention, there is an effect in which a switching time from an RRC idle mode of a UE supporting a low latency service to a connected mode can be shortened.

In addition, according to a cell reselection method according to an embodiment of the present invention, the UE supporting the low latency service can select a cell having a short control delay in advance.

In addition, according to the present invention, there is an effect in which signaling overhead can be reduced by transmitting a scheduling delay in a broadcast scheme and calculating an uplink resource allocation time by the UE.

Moreover, according to the present invention, there is an effect in which power consumption of the UE can be reduced by allowing the UE to switch to a short dormant state before the time when the uplink resource is allocated by calculating the uplink resource allocation time.

Effects which can be obtained in the present invention are not limited to the aforementioned effects and other unmentioned effects will be clearly understood by those skilled in the art from the following description.

DESCRIPTION OF DRAWINGS

FIGS. 14a and 14b are diagrams illustrating one example of an uplink resource allocating method to which the present invention may be applied.

MODE FOR INVENTION

Figure 1:
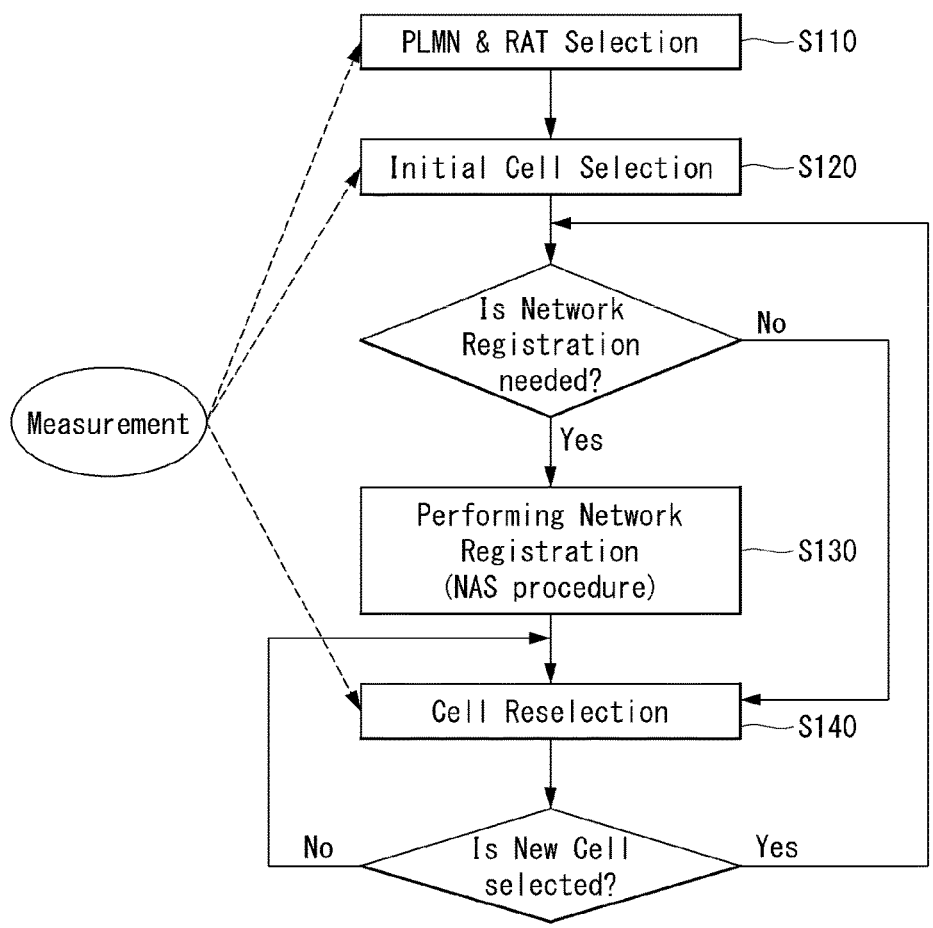
FIG. 1 is a flowchart illustrating the operation of a UE in the RRC idle state to which an embodiment of the present invention may be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In this specification, a base station has a meaning as a terminal node of a network directly communicating with a terminal. In this document, a specific operation described as being performed by a base station may be performed by an upper node of a base station. Namely, it is evident that, in a network including a plurality of network nodes including a base station, various operations performed for communication with a terminal may be performed by the base station or network nodes other than the base station. The base station (BS) may be replaced with a term, such as a 'fixed station', a 'Node B', a evolved-NodeB (eNB), a 'base transceiver system (BTS)', an 'access point (AP)', a 'macro eNB) (MeNB)' or a 'secondary eNB (SeNB)'.

Furthermore, a 'terminal" may be fixed or mobile and may be replaced with a term, such as a 'user equipment (UE)', a 'mobile station (MS)', a 'user terminal (UT)', a 'mobile subscriber station (MSS)', a 'subscriber station (SS)', an 'advanced mobile station (AMS)', a 'wireless terminal (WT)', a 'machine-type communication (MTC) device', a 'machine-to-machine (M2M) device', a 'device-to-device (D2D) device' or a wireless device.

In the following, "downlink (DL)" refers to communication from an eNB to a UE, and "uplink (UL)" refers to communication from a UE to an eNB. In downlink, a transmitter may be a part of an eNB and a receiver may be part of a UE. In uplink, a transmitter may be a part of a UE and a receiver may be part of an eNB.

Specific terms used in the embodiments of the present invention have been provided to help understanding of the present invention. These specific terms may be changed in other terms without departing from the technological spirit of the present invention.

The following technologies may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA) and 'non-orthogonal multiple access (NOMA)'. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-'UMTS) using E-UTRA. 3GPP LTE employs OFDMA for downlink and SC-FDMA for uplink. LTE-A is an evolution of 3GPP LTE.

FIG. 1 is a flowchart showing an operation of a UE in the RRC_IDLE state to which the present invention may be applied.

FIG. 1 shows a procedure of a UE being registered with a network through a cell selecting process and performing cell reselection if needed after the UE is initially turned on.

Referring the FIG. 1, the UE selects a RAT for communicating with a PLMN from which the UE intends to be served (S110). Information about the PLMN and the RAT may be selected by a user of the UE. The user may use information stored in a Universal Subscriber Identity Module (USIM).

The UE selects a cell that belongs to cells whose measured BS and signal intensity or quality are greater than a specific value and that has the highest value (S120). This procedure may be called initial cell reselection. The cell selecting procedure is described later. After the cell selection, the UE periodically receives system information from the BS. The predetermined value is a value defined in a communication system for ensuring a physical signal quality in data transmission/reception. Therefore, the predetermined value may be different depending on an applied RAT.

The UE performs a network registration procedure if needed (S130). The UE registers its own information (i.e., IMSI) in order to be served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S140). If the strength or quality value of a signal measured from a base station from which the UE is serviced is lower than a value measured from a base station of a neighbor cell, the UE, selects one of other cells providing a better signal characteristic than the base station to which the UE is linked. This process is referred to as cell reselection as distinguished from the initial cell selection of the No. 2 process. In this case, a temporal restricting condition is assigned to prevent cells from being frequently reselected as the signal characteristics vary. Hereinafter, cell selecting and reselecting procedures will be described.

Cell Selecting and Reselecting Processes

The cell selecting process is largely divided into two types.

First, an initial cell selecting process is performed and in this process, the UE does not have prior information on a wireless channel. Therefore, the UE searches all wireless channels to find a suitable cell. In each channel, the UE finds the strongest cell. Thereafter, when the UE finds the suitable cell fulfilling a cell selection criterion, the UE selects the corresponding cell.

Next, the UE may select the cell by using stored information or using information broadcast in the cell. Therefore, the may be selected more fast the initial cell selecting process. When the UE finds the cell fulfilling the cell selection criterion, the UE selects the corresponding cell. When the UE may not find the suitable cell fulfilling the cell selection criterion is not found through this process, the UE performs the initial cell selecting process.

The cell selection criterion may be defined as shown in Equation 1 below.

$$\text{Srxlev} > 0 \text{ AND } \text{Squal} > 0$$

where:

$$\text{Srxlev} = Q_{rxlevmeas} - (Q_{rxlevmin} + Q_{rxlevminoffset}) - P\text{compensation} - Q\text{offset}_{temp}$$

$$\text{Squal} = Q_{qualmeas} - (Q_{qualmin} + Q_{qualminoffset}) - Q\text{offset}_{temp} \leftarrow \text{'}$$

[Equation 1]

Herein, each variable of Equation 1 may be defined as shown in Table 1 below.

TABLE 1

| | |
|---|---|
| Srxlex | Cell selection RX level value (dB) |
| Squal | Cell selection quality value (dB) |
| Qoffset$_{temp}$ | Offset temporarily applied to a cell as specified in [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm) |
| Q$_{qualmin}$ | Minimum required quality level in the cell (dB) |
| Q$_{rxlevminoffset}$ | Offset to the signalled Q$_{rxlevmin}$ taken into account in the Srxlev evaluation as a result of a periodic search for a higher priority PLMN while camped normally in a VPLMN [5] |
| Q$_{qualminoffset}$ | Offset to the signalled Q$_{qualmin}$ taken into account in the Squal evaluation as a result of a periodic search for a higher priority PLMN while camped normally in a VPLMN [5] |
| Pcompensation | max(P$_{EMAX}$ − P$_{PowerClass}$, 0) (dB) |
| P$_{EMAX}$ | Maximum TX power level an UE may use when transmitting on the uplink in the cell (dBm) defined as P$_{EMAX}$ in [TS 36.101] |
| P$_{PowerClass}$ | Maximum RF output power of the UE (dBm) according to the UE power class as defined in [TS 36.101] |

The signaled values Qrxlevminoffset and Qqualminoffset may be applied only when the cell selection is evaluated as a result of the periodic search for the higher priority PLMN while the UE is camping on the regular cell in the VPLMN.

During the periodic search for the higher priority PLMN as described above, the UE may perform the cell selection evaluation using the stored parameter values from other cells of such a higher priority PLMN.

Once the UE has selected a predetermined cell through the cell selecting process, the strength or quality of the signal between the UE and the BS may be changed due to mobility of the UE or change of a wireless environment. Thus, when the quality of the selected cell is degraded, the UE may select another cell that provides better quality. When the cell is reselected as described above, a cell is selected, which generally provides better signal quality than the currently selected cell. Such a process is referred to as cell reselection. The cell reselection process basically aims at selecting a cell that provides the best quality to the UE in terms of quality of a radio signal.

In addition to the quality of the radio signal, the network may determine a priority for each frequency and notify the priority to the UE. The UE receiving the priority takes priority over a radio signal quality criterion in the cell reselection process.

There is a method for selecting or reselecting the cell according to signal characteristics of the wireless environment and in selecting the cell for reselection in the cell reselection, there may be the following cell reselection method according to an RAT and a frequency characteristic of the cell.

Intra-frequency cell reselection: Reselecting a cell having the same RAT and the same center frequency as the cell on which the UE camps Inter-frequency cell reselection: Reselecting a cell having the same RAT as and a different center frequency from the cell on which the UE camps Inter-RAT cell reselection: Reselecting a cell using an RAT different from an RAT on which the UE camps A principle of the cell reselection process is described below.

First, the UE measures qualities of a serving cell and a neighboring cell for the cell reselection.

Second, the cell reselection is performed based on the cell reselection criterion. The cell reselection criterion has the following characteristics with respect to the serving cell and neighboring cell measurement.

The intra-frequency cell reselection is basically based on a ranking. The ranking is a task of defining index values for cell reselection evaluation and ordering the cells in descending order of the index values using the index values. A cell with the best indicator is often called a highest ranked cell. The cell index value is a value obtained by applying a frequency offset or a cell offset as necessary based on a value measured by the UE for the corresponding cell.

The inter-frequency cell reselection is based on a frequency priority provided by the network. The UE attempts to camp on a frequency with the highest frequency priority. The network may provide a frequency priority which inter-cell UEs is to commonly apply through broadcast signaling or provide the frequency priority for each frequency for each UE through UE dedicated signaling. A cell reselection priority provided through the broadcast signaling may be referred to as a common priority and a cell reselection priority which the network sets for each UE may be referred to as a dedicated priority. When the UE receives the dedicated priority, the UE may receive a validity time associated with the dedicated priority together. Upon receiving the dedicated priority, the UE starts a validity timer set to the validity time received together. The UE applies the dedicated priority in an RRC idle mode while the validity timer operates. When the validity timer expires, the UE discards the dedicated priority and applies the common priority again.

For the inter-frequency cell reselection, the network may provide a parameter (e.g., a frequency-specific offset) used for the cell reselection to the UE for each frequency.

For the intra-frequency cell reselection or inter-frequency cell reselection, the network may provide a neighboring cell list (NCL) used for the cell reselection to the UE. The NCL includes a cell-specific parameter (e.g., cell-specific offset) used for the cell reselection.

For the intra-frequency cell reselection or inter-frequency cell reselection, the network may provide a cell reselection black list used for the cell reselection to the UE. The UE does not perform the cell reselection for cells included in the black list.

Next, the ranking performed in the cell reselection evaluation process will be described.

A ranking criterion used to give the priority to the cell may be defined as Equation 2 below.

$$R_s = Q_{meas,s} + Q_{hyst} - Qoffset_{temp!}, R_n = Q_{meas,n} - Offset - Qoffset_{temp}$$ [Equation 2]

Herein, Rs represents the ranking criterion of the serving cell, Rn represents the ranking criterion of the neighboring cell, Qmeas,s represents a quality value measured by the UE with respect to the serving cell, Qmeas,n represents the quality value measured by the UE with respect to the neighboring cell, Qhyst represents a hysteresis value for the ranking, Qoffset represents an offset between two cells, and $Qoffset_{temp}$ represents an offset that is temporarily applied to the cell.

At an intra-frequency, Qoffset=Qoffsets,n when the UE receives the offset (Qoffsets,n) between the serving cell and the neighboring cell and Qoffset=0 when the UE does not receive Qoffsets,n.

At an inter-frequency, Qoffset=Qoffsets,n+Qfrequency when the UE receives the offset (Qoffsets,n) for the corresponding cell and Qoffset=Qfrequency when the UE does not receive Qoffsets,n.

When the ranking criterion Rs of the serving cell and the ranking criterion Rn of the neighboring cell fluctuate in a state in which both criteria are similar to each other, the ranking is frequently changed as a fluctuation result, so that the UE may alternately reselect the two cells. Qhyst is a parameter for preventing the UE from alternately reselecting two cells by giving hysteresis in the cell reselection.

The UE measures Rs of the serving cell and Rn of the neighboring cell according to the above equation, and regards the cell having the highest ranking criterion value as the highest ranked cell, and reselects the cell.

According to the criterion, it can be verified that the quality of the cell serves as the most important criterion in the cell reselection. When the reselected cell is not the suitable cell, the UE excludes the corresponding frequency or the corresponding cell from a cell reselection target.

When the UE performs the cell reselection according to the cell reselection evaluation, the UE may determines that the cell reselection criterion is fulfilled and move the cell to the selected target cell when the cell reselection criterion is fulfilled for a specific time. Here, the specific time may be given from the network as a Treselection parameter. Treselection specifies a cell reselection timer value and may be defined for each frequency of E-UTRAN and for different RATs.

Hereinafter, cell reselection information used for the cell reselection by the UE will be described.

The cell reselection information may be transmitted while being included in system information broadcasted from the network in the form of the cell reselection parameter and provided to the UE. The cell reselection parameters provided to the UE may be types shown in Table 2 below.

TABLE 2

| Parameter | Description |
| --- | --- |
| cellReselectionPriority | The cellReselectionPriority parameter specifies the priority for the frequency of the E-UTRAN, the frequency of the UTRAN, and a group of GERAN frequencies, a band class of CDMA2000 HRPD, or the band class of CDMA2000 1xRTT. |
| $Qoffset_{s,n}$ | This specifies the offset between the two cells. |
| $Qoffset_{frequency}$ | Frequency specific offset for equal priority E-UTRAN frequencies. |
| $Qoffset_{temp}$ | This specifies the additional offset to be used for cell selection and re-selection. It is temporarily used in case the RRC Connection Establishment fails on the cell as specified in [3]. |
| $Q_{hyst}$ | This specifies the hysteresis value for ranking criteria. |
| $Q_{qualmin}$ | This specifies the minimum required quality level in the cell in dB. |
| $Q_{rxlevmin}$ | This specifies the minimum required Rx level in the cell in dBm. |
| $Treselection_{RAT}$ | This specifies the cell reselection timer value. For each target E-UTRA frequency and for each RAT (other than E-UTRA) a specific value for the cell reselection timer is defined, which is applicable when evaluating reselection within E-UTRAN or towards other RAT (i.e. $Treselection_{RAT}$ for E-UTRAN is $Treselection_{EUTRA}$, for UTRAN $Treselection_{UTRA}$ for GERAN $Treselection_{GERA}$, for $Treselection_{CDMA\_HRPD}$, and for $Treselection_{CDMA\_1xRTT}$). Note: $Treselection_{RAT}$ is not sent on system information, but used in reselection rules by the UE for each RAT. |
| $Treselection_{EUTRA}$ | This specifies the cell reselection timer value $Treselection_{RAT}$ for E-UTRAN. The parameter can be set per E-UTRAN frequency [3]. |
| $Treselection_{UTRA}$ | This specifies the cell reselection timer value $Treselection_{RAT}$ for UTRAN. |
| $Treselection_{GERA}$ | This specifies the cell reselection timer value $Treselection_{RAT}$ for GERAN. |
| $Treselection_{CDMA\_HRPD}$ | This specifies the cell reselection timer value $Treselection_{RAT}$ for CDMA HRPD. |
| $Treselection_{CDMA\_1xRTT}$ | This specifies the cell reselection timer value $Treselection_{RAT}$ for CDMA 1xRTT. |

TABLE 2-continued

| Parameter | Description |
|---|---|
| $Thresh_{X,\ HighP}$ | This specifies the Srxlev threshold (in dB) used by the UE when reselecting towards a higher priority RAT/frequency than the current serving frequency. Each frequency of E-UTRAN and UTRAN, each group of GERAN frequencies, each band class of CDMA2000 HRPD and CDMA2000 1xRTT might have a specific threshold. |
| $Thresh_{X,\ HighQ}$ | This specifies the Squal threshold (in dB) used by the UE when reselecting towards a higher priority RAT/frequency than the current serving frequency. Each frequency of E-UTRAN and UTRAN FDD might have a specific threshold. |
| $Thresh_{X,\ LowP}$ | This specifies the Squal threshold (in dB) used by the UE when reselecting towards a higher priority RAT/frequency than the current serving frequency. Each frequency of E-UTRAN and UTRAN FDD might have a specific threshold. |
| $Thresh_{X,\ LowQ}$ | This specifies the Srxlev threshold (in dB) used by the UE when reselecting towards a lower priority RAT/frequency than the current serving frequency. Each frequency of E-UTRAN and UTRAN, each group of GERAN frequencies, each band class of CDMA2000 HRPD and CDMA2000 1xRTT might have a specific threshold. |
| $Thresh_{Serving,\ LowP}$ | This specifies the Srxlev threshold (in dB) used by the UE on the serving cell when reselecting towards a lower priority RAT/frequency. |
| $Thresh_{Serving,\ LowQ}$ | This specifies the Squal threshold (in dB) used by the UE on the serving cell when reselecting towards a lower priority RAT/frequency. |
| $S_{IntraSearchP}$ | This specifies the Srxlev threshold (in dB) for intra-frequency measurements. |
| $S_{IntraSearchQ}$ | This specifies the Squal threshold (in dB) for intra-frequency measurements. |
| $S_{nonIntraSearchP}$ | This specifies the Srxlev threshold (in dB) for E-UTRAN inter-frequency and inter-RAT measurements. |
| $S_{nonIntraSearchQ}$ | This specifies the Squal threshold (in dB) for E-UTRAN inter-frequency and inter-RAT measurements. |

Meanwhile, the cell reselection parameter may be scaled according to the mobility of the UE. The mobility of the UE may be estimated based on the number of times at which the UE moves through the cell reselection and/or handover during a specific time interval, which is referred to as mobility state estimation (MSE). According to the MSE, the mobility of the UE may be estimated to be one of a normal mobility state, a medium mobility state, and a high mobility state.

A parameter that may be used as a criterion for estimating the mobility state of the UE in the MSE may be provided. The TCRmax specifies a specific time interval for movement performance counting of other UEs to the MSE. NCR_H indicates the maximum number of cell reselections for entering high mobility. NCR_M indicates the maximum number of cell reselections for entering intermediate mobility. TCRmaxHyst specifies an additional time interval before the UE may enter the normal mobility state.

The UE in the RRC_IDLE state performs the cell reselection when a cell reselection condition is fulfilled. When the number of times that the UE performs the cell reselection during TCRmax exceeds a first threshold value NCR_H, the mobility state of the UE fulfills a condition of a high mobility state. Meanwhile, when the number of times that the UE performs the cell reselection during TCRmax exceeds a second threshold value NCR_M and does not exceed the first threshold value NCR_H, the mobility state of the UE fulfills the condition of the medium mobility state. When the number of times that the UE performs the cell reselection during TCRmax does not exceed the second threshold value NCR_M, the mobility state of the UE fulfills the condition of the normal mobility state. For example, when the UE is not detected as the high mobility state and the normal mobility state during an additional time interval TCRmaxHyst, the UE may be estimated to be in the normal mobility state. However, when the UE continuously performs the cell reselection between two identical cells, it may not be counted as the number of cell reselections.

A scaling factor may be specified according to the mobility state of the UE according to the MSE and the scaling factor may be applied to one or more cell reselection parameters. For example, the scaling factors sf-Medium and sf-High according to the medium mobility and the high mobility may be applied to Qhyst, TreselectionEUTRA, TreselectionUTRA, TreselectionGERA, TreselectionCDMA_HRPD, and TreselectionCDMA_1xRTT.

Hereinafter, a feature in which the cell reselection information such as the cell reselection parameters are provided through the system information will be described.

SystemInformationBlockType3 (SIB3) may include the cell reselection information which may be commonly applied to intra-frequency cell reselection, inter-frequency cell reselection, and/or inter-RAT cell reselection. The cell reselection parameters provided to the UE as SIB3 may include Qhyst, sf-High, sf-Medium, Qqualmin, Qrxlevmin, SIntraSearchP, SIntraSearchQ, SnonIntraSearchP, SnonIntraSearchQ, ThreshServing, LowP, ThreshServing, LowQ, TreselectionEUTRA, and the like.

SystemInformationBlockType4 (SIB4) as information for the intra-frequency cell reselection may include cell reselection information associated with the neighboring cell. For example, SIB4 may include list information of intra-frequency neighboring cells listed in the black list and information about a list of intra-frequency neighboring cells having specific cell reselection parameters. Further, SIB4 may include Qoffsets,n.

SystemInformationBlockType5 (SIB5) may include information for inter-frequency cell reselection. SIB5 may include cell reselection parameters that may be commonly applied to a specific frequency and specific cell reselection parameters. For example, SIB5 may include list information of inter-frequency neighboring cells listed in the blacklist, list information of inter-frequency neighboring cells with the specific cell reselection parameters, list information of neighboring inter-frequency, a scaling factor which may be applied to Qoffsets,n, Qoffsetfrequency, Qsqualmin, ThreshX, HighP, ThreshX, HighQ, ThreshX, LowP, ThreshX, LowQ, TreselectionEUTRA, and TreselectionEUTRA, and the like.

SystemInformationBlockType6 (SIB6) may include information for inter-RAT cell reselection. That is, SIB6 may include the UTRA frequency and information on the UTRA neighboring cell suitable for the cell reselection. SIB6 may include cell reselection parameters that may be commonly applied to a specific frequency. For example, SIB6 may include carrier frequency list information of UTRA FDD, Qqualmin, Qrxlevmin, TreselectionUTRA, a scaling factors applicable to TreselectionUTRA, ThreshX, HighP, ThreshX, HighQ, ThreshX, LowP, ThreshX, LowQ, and the like.

SystemInformationBlockType7 (SIB7) may include information for inter-RAT cell reselection. That is, SIB7 may include information on a GERAN frequency. For example, SIB7 may include GERAN carrier frequency list information, neighboring GERAN carrier frequency list information, Qqualmin, Qrxlevmin, ThreshX, HighP, ThreshX, LowP, TreselectionGERAN, and a scaling factor applicable to TreselectionGERAN in one group of GERAN carrier frequencies.

SystemInformationBlockType8 (SIB8) may include information for inter-RAT cell reselection. That is, SIB8 may include information on a CDMA2000 frequency and information on a CDMA2000 neighbor cell suitable for the cell reselection. SIB8 may include cell reselection parameters that may be commonly applied to a specific frequency and specific cell reselection parameters. For example, SIB8 may include CDMA neighbor cell list information, CDMA 2000 frequency list and frequency-specific neighboring cell list information, a scaling factor applicable to ThreshX, HighP, ThreshX, LowP, TreselectionCDMA_HRPD, and TreselectionCDMA_HRPD, and the like.

Meanwhile, the cell reselection information may be provided to the UE while being included in a RRC connection release message, which is an RRC message transmitted for releasing RRC connection between the network and the UE. For example, the RRC connection release message may include a sub-carrier frequency list and a cell reselection priority of E-UTRAN, the sub-carrier frequency list and cell reselection priority of UTRA-FDD, the sub-carrier frequency list and cell reselection priority of UTRA-TDD, the sub-carrier frequency list and cell reselection priority of GERAN, the band class list and cell reselection priority of CDMA2000 HRPD, the band class list and cell reselection priority of CDMA2000 1×RTT, and the like.

Hereinafter, RAN sharing by a plurality of providers will be described.

The plurality of providers may individually provide a service by constructing a RAN, but may also provide the service to a subscriber by sharing a cell constructed by a specific service provider. This is called RAN sharing. In this case, the cell shared by the plurality of providers may broadcast a PLMN list. The PLMN list may be transmitted in SIB 1 of the system information broadcasted by the cell.

On the other hand, a PLMN identifier listed first in the PLMN list included in the SIB1 may be implemented to indicate a primary PLMN.

Cell reselection information provided by the shared cell in a situation where one cell is shared by the plurality of providers may be commonly applied to all PLMNs in the PLMN list. The cell reselection information provided by the generally shared cell will be configured to primarily match a policy of the primary PLMN. Therefore, UEs receiving the service according to a secondary PLMN perform the cell reselection based on information other than cell reselection information optimized for providing the service.

Figure 2:
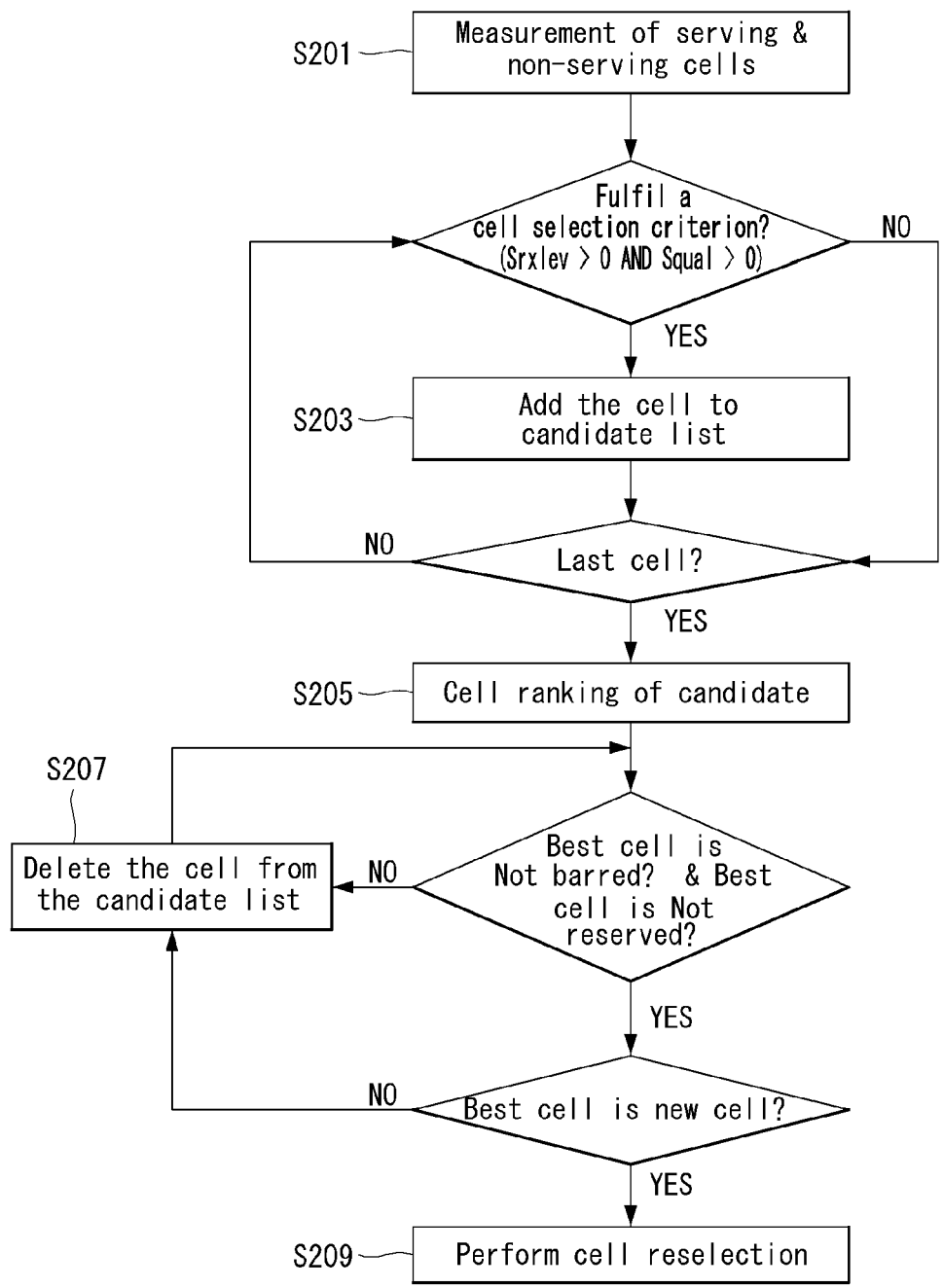
FIG. 2 is a flowchart illustrating a cell reselection procedure in the related art.

FIG. 2 is a flowchart illustrating a cell reselection process.

Referring to FIG. 2, a UE in an idle mode in a cellular system (e.g., LTE and WiMAX2) utilizes stored information or information broadcasted in the cell (e.g., signal quality or signal strength) to select the cell.

Specifically, the qualities of the serving cell and the neighboring cell are measured for the cell reselection in the idle mode (S201) and it is determined whether the measured values fulfill the cell selection criterion. The quality may be reference signal received power (RSRP) or reference signal received quality (RSRQ).

The cell selection criterion may be determined based on whether to fulfill Equation 1.

When the measured cell fulfills the cell selection criterion, the UE in the idle mode adds the measured cell to a candidate cell list (S203).

The operation of adding the measured cell to the candidate cell list is repeatedly performed until the measured cell is a last cell.

Thereafter, the UE in the idle mode sets the ranking criterion value with respect to the cells in the candidate cell list using the schemes method (S205). After setting the ranking criterion values for all candidate cells, the UE in the idle mode determines whether the best cell having the highest ranking criterion value is a forbidden cell, a reserved cell, and a new cell and when the cell is not forbidden, reserved, or new cell, the UE deletes the corresponding cell from the candidate cell list (S207).

The UE in the idle mode repeats such a process to select the selected best cell (S209).

When the cell is selected or reselected using such a method, only whether to access of the corresponding cell may be determined and there is a problem that a scheduling delay for message or data transmission may not be known.

Therefore, the present invention proposes a method in which the base station notifies the scheduling delay for the message or data transmission to the UE to allow the UE to select or reselect the cell by using the notification.

Figure 3:
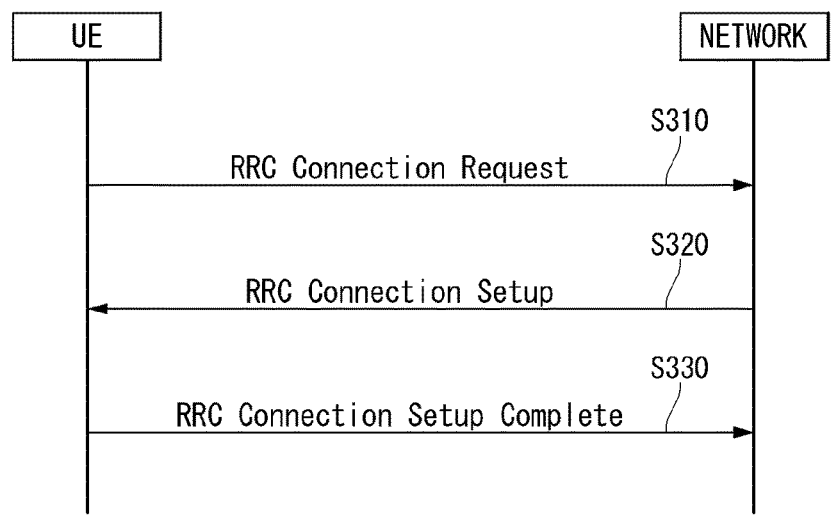
FIG. 3 is a flowchart illustrating a process of establishing an RRC connection to which an embodiment of the present invention may be applied.

FIG. 3 is a flowchart showing an RRC connection establishment procedure to which the present invention may be applied.

A UE sends, to a network, an RRC connection request message for requesting an RRC connection (S310). The network sends an RRC connection setup message in response to the RRC connection request (S320). After receiving the RRC connection setup message, the UE enters an RRC connection mode.

The UE sends, to the network, an RRC connection setup complete message used to confirm the successful completion of the RRC connection establishment (S330).

Figure 4:
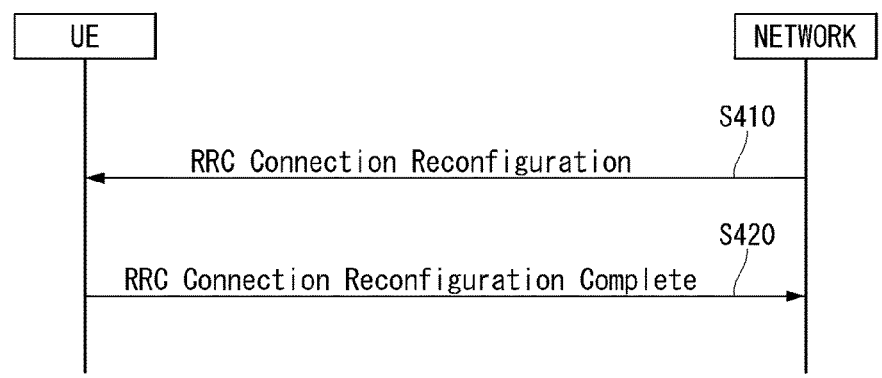
FIG. 4 is a flowchart illustrating an RRC connection reestablishment process to which an embodiment of the present invention may be applied.

FIG. 4 is a flowchart showing an RRC connection reconfiguration procedure.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S410). In response to the RRC connection reconfiguration, the UE sends to the network an RRC connection reconfiguration complete message used to confirm successful completion of the RRC connection reconfiguration (S420).

An RRC connection reestablishment procedure is now described below in greater detail.

Figure 5:
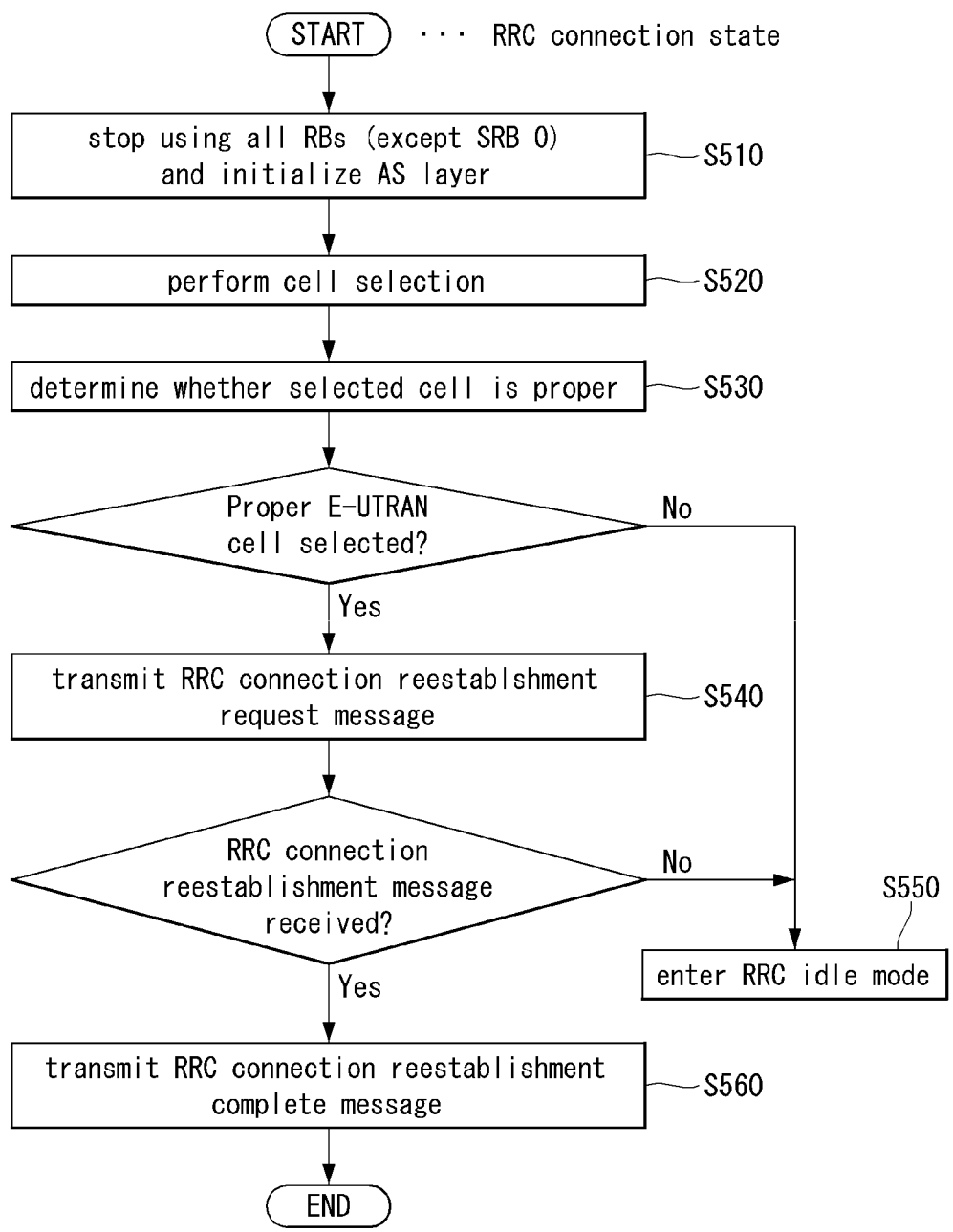
FIG. 5 is a diagram illustrating an RRC connection reestablishment procedure to which an embodiment of the present invention may be applied.

FIG. 5 is a view illustrating an example RRC connection reestablishment procedure to which the present invention may apply.

Referring to FIG. 5, a UE stops using all of the configured radio bearers except SRB 0 (Signaling Radio Bearer #0) and initializes various sub-layers of AS (Access Stratum) (S510).

Further, the UE sets each sub-layer and physical layer as default configuration. During such procedure, the UE maintains the RRC connection state.

The UE performs a cell selecting procedure for conducting an RRC connection reestablishment procedure (S520). Although the UE maintains the RRC connection state during the RRC connection reestablishment procedure, the cell selecting procedure may be performed like the cell selecting procedure performed by the UE in the RRC idle mode.

After performing the cell selecting procedure, the UE identifies the system information on a corresponding cell to determine whether the corresponding cell is a proper cell (S530). In case the selected cell is determined to be a proper E-UTRAN cell, the UE sends an RRC connection reestablishment request message to the corresponding cell (S540).

Meanwhile, if the cell selected through the cell selecting procedure for performing the RRC connection reestablishment procedure is determined to be a cell using another RAT other than the E-UTRAN, the UE stops the RRC connection reestablishment procedure and enters the RRC idle mode (S550).

The UE may be implemented to finish identifying whether the cell is proper within a limited time through the cell selecting procedure and reception of the system information on the selected cell. To that end, the UE may run a timer as the UE initiates the RRC connection reestablishment procedure. The timer, when the UE is determined to have selected a proper cell, may stop. In case the timer expires, the UE considers it as failure of the RRC connection reestablishment procedure and may enter the RRC idle mode. This timer is hereinafter referred to as a radio link failure timer. According to the LTE spec. TS 36.331, a timer denoted T311 may be utilized as the radio link failure timer. The UE may obtain configuration values of the timer from the system information of the serving cell.

When receiving the RRC connection reestablishment request message from the UE and accepting the request, the cell transmits an RRC connection reestablishment message to the UE.

When receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

Accordingly, the SRB 1 between the UE and the cell is opened, and RRC control messages may be exchanged between the UE and the cell. The UE completes resuming SRB1 and sends to the cell an RRC connection reestablishment complete message indicating that the RRC connection reestablishment procedure has been complete (S560).

In contrast, if the cell receives the RRC connection reestablishment request message from the UE, but does not accept the request, the cell transmits an RRC connection reestablishment reject message to the UE.

If the RRC connection reestablishment procedure is successfully done, the cell and the UE perform an RRC connection reestablishment procedure. Accordingly, the UE recovers to the state before performing the RRC connection reestablishment procedure, thereby maximally guaranteeing service continuity.

Uplink Resource Allocation Procedure

In the case of the 3GPP LTE/LTE-A system, a method for data transmission and reception based on the scheduling of an eNB is used to maximize the utilization of radio resources. This means that if a UE has data to transmit, the UE requests the eNB to allocate uplink resources in the first place and is capable of transmitting data using only the uplink resources allocated by the eNB.

Figure 6:
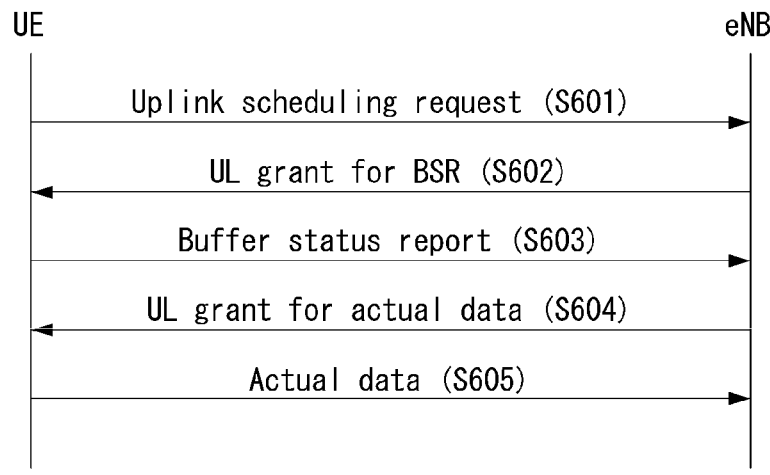
FIG. 6 is a diagram illustrating a process of allocating UL resources to a UE in a wireless communication system to which an embodiment of the present invention may be applied.
Figure 6:
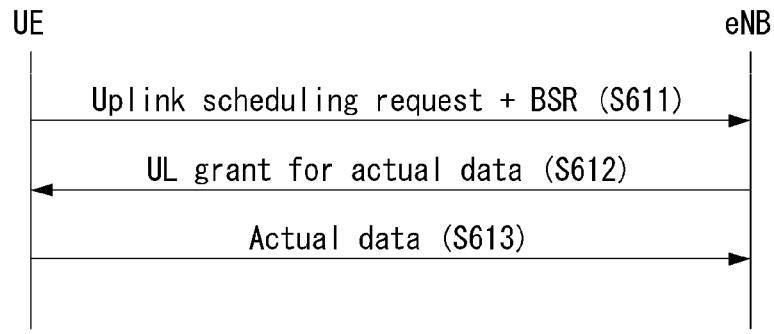

FIG. 6 illustrates an uplink resource allocation process of a UE in a wireless communication system to which the present invention may be applied.

For efficient use of radio resources in uplink transmission, an eNB needs to know which type of data and how much of the data will be transmitted to each UE in uplink. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 6 (a) illustrates an uplink resource allocation process for actual data if the uplink radio resources for buffer status reporting (BSR) have not been allocated to a UE. In other words, in the case of a UE whose state switches from the DRX mode to the active mode, since no data resources are allocated beforehand, the UE has to request resources for uplink data, starting with SR transmission through the PUCCH, and in this case, an uplink resource allocation procedure of five steps is employed.

FIG. 6(a) illustrates a case where PUSCH resources for transmitting BSR are not allocated to the UE, and the UE first transmits a scheduling request (SR) to the eNB in order to receive allocated PUSCH resources (S601).

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR may be transmitted are set up by an upper layer (for example, the RRC layer) in a UE-specific manner, and the SR configuration include SR periodicity and SR sub-frame offset information.

When the UE receives from the eNB an UL grant with respect to the PUSCH resources for BSR transmission (S602), the UE transmits a triggered BSR to the eNB through the PUSCH resources allocated by the UL grant (S603).

The eNB checks the amount of data to be actually transmitted by the UE through uplink transmission based on the BSR and transmits an UL grant for the PUSCH resources for the transmission of the actual data to the UE (S604). The UE that has received the UL grant for the transmission of the actual data transmits the actual uplink data to the eNB through the allocated PUSCH resources (S605).

FIG. 6(b) illustrates an uplink resource allocation process for actual data if uplink radio resources for buffer status reporting are allocated to a UE.

FIG. 6(b) illustrates a case where PUSCH resources for BSR transmission have already been allocated to the UE. The UE transmits the BSR through the allocated PUSCH resources and transmits a scheduling request to the eNB along with the BSR transmission S611. Next, by using the BSR, the eNB check the amount of data that the UE actually transmits through uplink transmission and transmits to the UE an UL grant with respect to the PUSCH resources for transmission of actual data S612. The UE, which has received an UL grant for transmission of actual data, transmits actual uplink data to the eNB through the allocated PUSCH resources S613.

Figure 7:
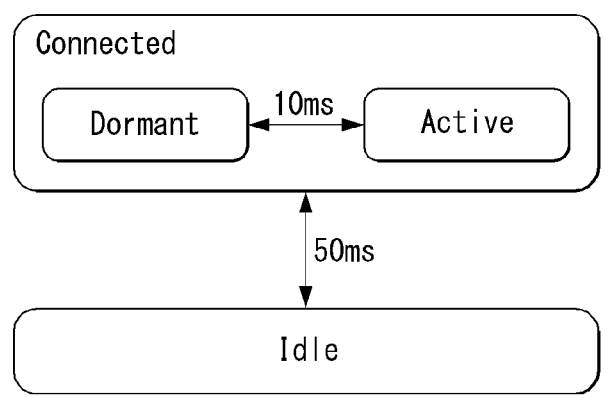
FIG. 7 is a diagram illustrating latency in a control plane (C-plane) that is required in 3GPP LTE-A to which an embodiment of the present invention may be applied.

FIG. 7 is a diagram illustrating latency in a control plane (C-plane) that is required in 3GPP LTE-A to which an embodiment of the present invention may be applied.

Figure 13:
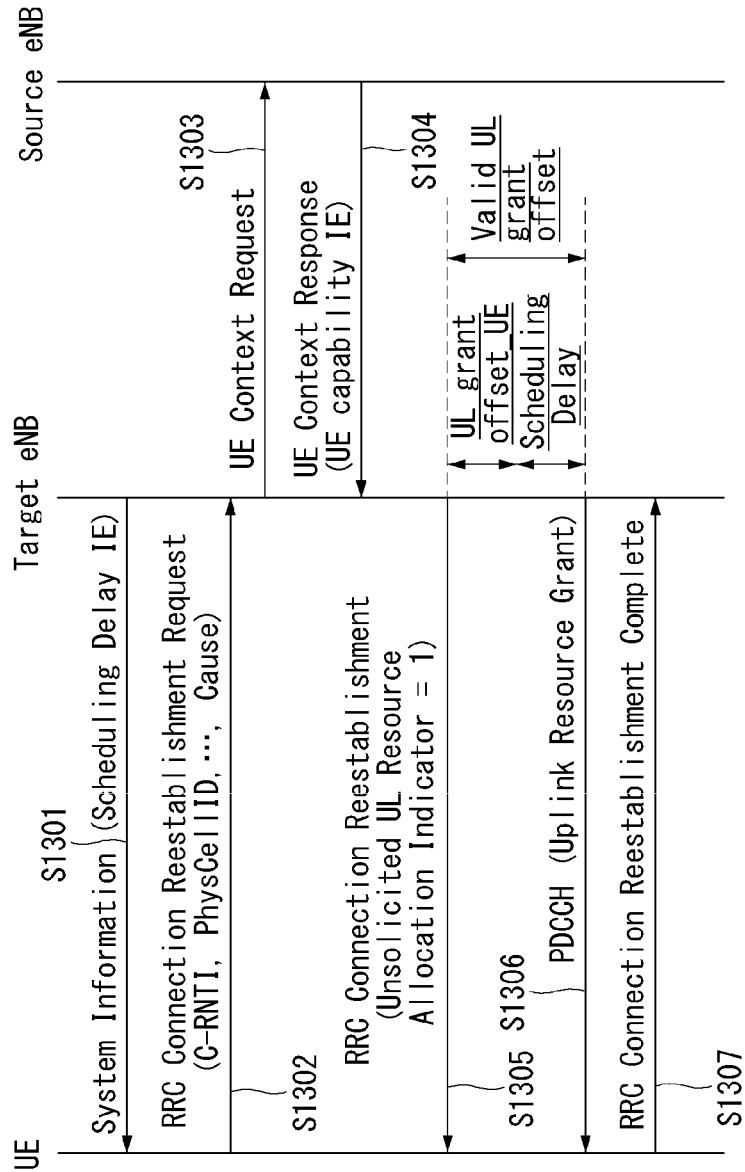
FIG. 13 is a flowchart illustrating one example of an RRC connection reconfiguration method to which the present invention may be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.
 Uplink initiated transition, synchronized
 Uplink initiated transition, unsynchronized
 Downlink initiated transition, synchronized
 Downlink initiated transition, unsynchronized
 Random Access Channel (RACH) Procedure FIGS. 8(a) and 8(b) illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

Figure 8:
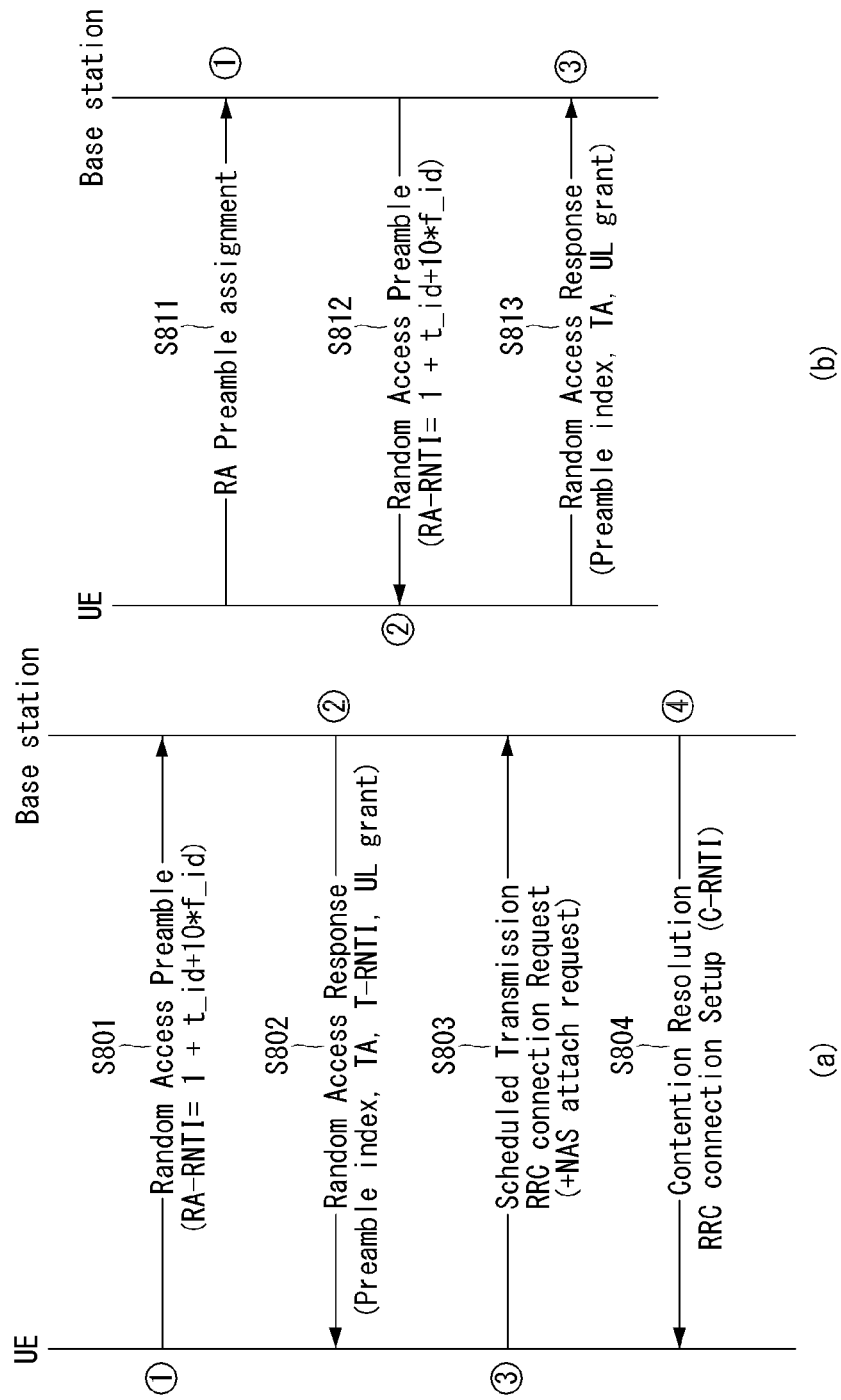
FIGS. 8 (a) and 8 (b) are a diagram illustrating an example of a random access procedure to which an embodiment of the present invention may be applied.

FIG. 8(a) illustrates one example of a contention-based random access procedure, and FIG. 14b illustrates one example of a non-contention based random access procedure.

First, the contention-based random access procedure will be described with reference to FIG. 8(a).

The UE receives information about random access from the eNB through system information and stores the received information. Afterwards, in case random access is needed, the UE transmits a random access preamble (which is also called a message 1) to the eNB S801.

If the eNB receives a random access preamble from the UE, the eNB transmits a random access response message (which is also called a message 2) to the UE S802. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S803. At this time, uplink transmission may be described as scheduled transmission.

After receiving the uplink transmission from the UE, the eNB transmits a message for contention resolution (which is also called a message 4) to the UE through a downlink shared channel (DL-SCH) S804.

Next, a non-contention based random access procedure will be described with reference to FIG. 8(b).

Before the UE transmits a random access preamble, the eNB allocates a non-contention random access preamble to the UE S811.

The non-contention random access preamble can be allocated through a handover command or dedicated signaling such as signaling through the PDCCH. In case non-contention random access preamble is allocated to the UE, the UE transmits the allocated non-contention random access preamble to the eNB S812.

Afterwards, similarly to the S802 step of the contention-based random access procedure, the UE can transmit a random access response (which is also called a message 2) to the UE S813.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Next, a UL data transmission method in LTE (-A) or 802.16 will be described in brief.

A cellular system such as an LTE(-A) system or an 802.16m system uses a base station scheduling-based resource allocation scheme.

A UE having data (i.e., UL data) to be transmitted in a system using the base station scheduling-based resource allocation scheme requests to the base station a resource for the corresponding data transmission before transmitting data.

Such a scheduling request by the UE may be performed through scheduling request (SR) transmission to the PUCCH or buffer status report (BSR) transmission to the PUSCH.

In addition, when resources to transmit the SR or BSR are not allocated to the UE, the UE may request the uplink resource to the base station through an RACH procedure.

The base station that receives the scheduling request from the UE allocates the uplink resource to be used by the corresponding UE to the UE through a downlink control channel (i.e., an UL grant message and a DCI for LTE(-A)).

In this case, the UL grant transmitted to the UE may be notified by explicitly signaling to which subframe resource the resource allocated to the UE corresponds, but the resource is allocated to a subframe after a specific time (e.g., 4 ms in the case of the LTE) to define an appointed time between the UE and the base station.

As described above, allocating, by the base station, the resources after Xms (e.g., 4 ms in the case of the LTE(-A)) to the UE means allocating, by the UE, the resources of the UE by considering both a time of receiving and decoding the UL grant and a time of preparing and encoding the data to be transmitted.

Figure 9:
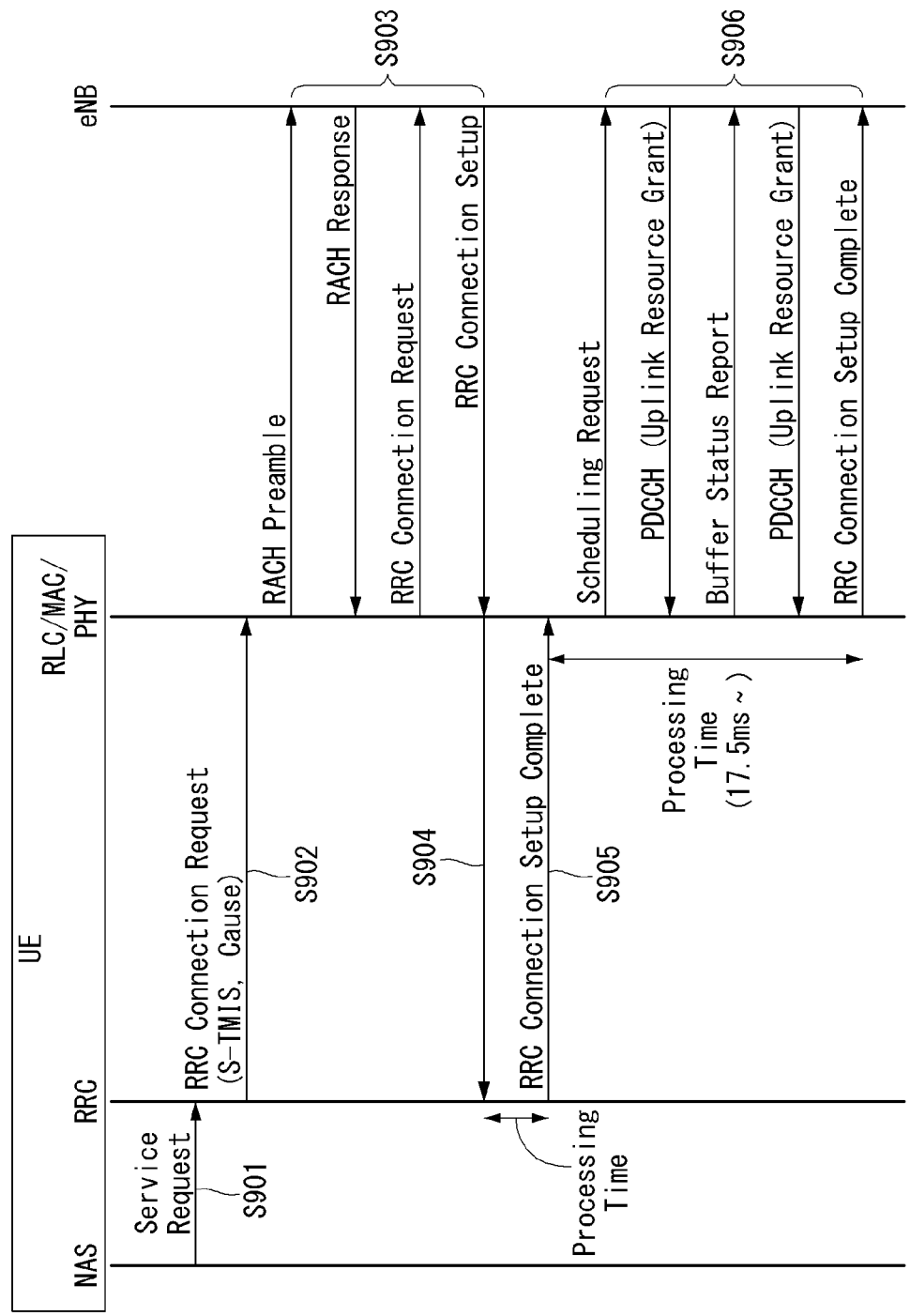
FIG. 9 is a flowchart illustrating one example of an uplink resource allocating scheme in the related art.

FIG. 9 is a flowchart illustrating one example of an uplink resource allocation scheme. First, when a service request is generated by a user or a specific event in the UE, a non access stratum of the UE transmits a service request message to an RRC layer of the UE (S901).

Thereafter, the RRC layer of the UE transmits an RRC connection request message to establish an RRC connection with the base station (S902).

Herein, the UE performs a RACH procedure with the base station in order to transmit the RRC connection request message to the base station (S903).

The RACH procedure represents a signal transmission/reception process in the RLC/MAC/PHY layer between the UE and the base station and a detailed description thereof will be made with reference to FIG. 21.

Thereafter, when the UE receives an RRC connection setup message from the base station through the RACH procedure (S904), the RRC layer transmits an RRC connection setup complete message through processing for the received RRC message (S905).

Herein, a delay may occur as long as the UE processes the received RRC message.

The UE performs the uplink resource allocation procedure described above (without the SR request, through the SR request, or through the SR and BSR) in order to transmit the RRC connection setup complete message to the base station.

That is, the UE transmits the RRC connection setup complete message to the base station through a UL resource region allocated through the UL resource allocation procedure.

Similarly, the delay may occur as long as the uplink resource allocation procedure is performed.

As a result, in the uplink resource allocation method in the related art, the delay as much as the following time occurs.

Uplink resource allocation scheme without the scheduling request by the UE
  21 ms delay occurrence (including A processing time for the received RRC message)
Uplink resource allocation scheme without the scheduling request by the UE
  Processing time for the received RRC message+9.5 ms (SR transmission) delay occurrence
Uplink resource allocation scheme through the scheduling request and buffer status report by the UE
  Processing time for the received message+17.5 ms (SR and BSR transmission) delay occurrence Hereinafter, the uplink resource allocation method for quickly establishing the RRC connection proposed in the present specification will be described in detail with reference to related drawings.

Figure 10:
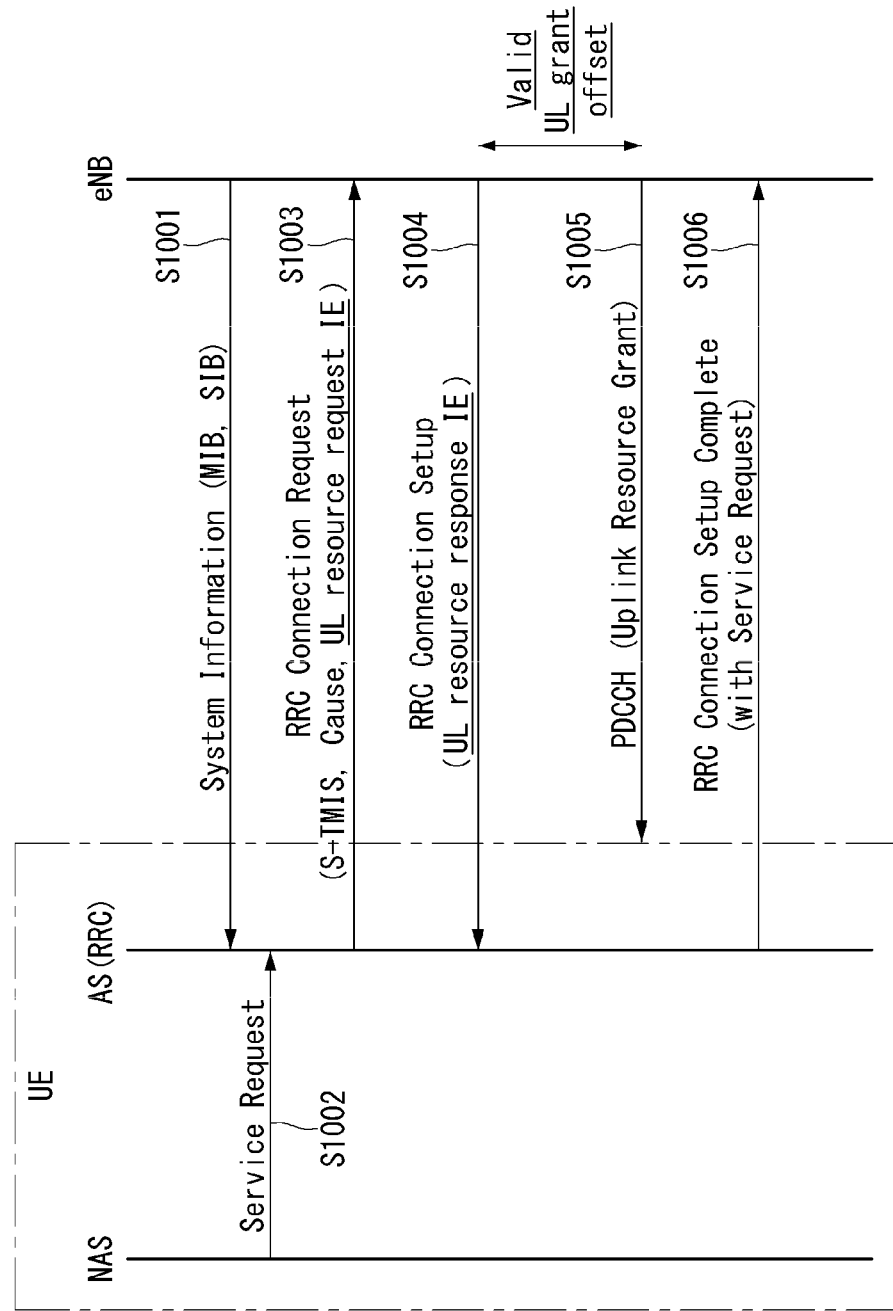
FIG. 10 is a flowchart illustrating one example of an uplink resource allocating method to which the present invention may be applied.

FIG. 10 is a flowchart illustrating one example of an uplink resource allocation method to which the present invention may be applied.

As illustrated in FIG. 10, a UE receives system information from a serving base station (S1001).

The system information may be classified into a master information block (MIB) or a system information block (SIB), and the MIB is transmitted through a PBCH and the SIB is transmitted through a PDSCH.

The detailed description of the system information will be given with reference to the above contents.

Then, the UE transmits a service request to an RRC (or AS) layer from an NAS (in the UE) (S1002).

Thereafter, the UE transmits an RRC Connection Request message to the serving base station in order to request uplink resource allocation through RRC connection establishment with the serving base station.

The RRC connection request message may include an S-TMIS, a Cause field, a UL resource request information element (resource request IE), and the like.

The Cause field represents information indicating a purpose of transmitting the RRC connection request message.

The Cause field may include information indicating that the RRC connection request message is an uplink resource allocation request for a purpose of a low delay service (e.g., mobile originating urgent or mobile terminating urgent).

The UL resource request IE may include at least one of a UE capability type field indicating a capability of a UE which intends to access the serving base station, a UL grant offset_UE field indicating a time when the UE requests a UL resource, and an UL grant size field indicating a size of a message or data to be transmitted through the uplink resource.

In addition, the UL resource request IE may further include a device type field indicating a type of the UE.

Thereafter, the UE receives an RRC Connection Setup message corresponding to a response to the RRC Connection Request message from the base station (S1004).

The RRC connection setup message may include a UL resource response IE indicating result information or response information of the uplink resource allocation request of the UE.

The UE may know a valid UL grant offset through the RRC connection setup message. In this case, the uplink resource allocation time is a sum of a request time of the UE and a scheduling delay of the serving base station.

Thereafter, the UE receives an uplink resource from the base station at a specific time or in a specific interval (S1005).

The UL resource grant may be performed through the PDCCH.

In addition, the base station may perform the uplink resource grant to the UE based on the UL resource request IE received from the UE.

Thereafter, the UE transmits an RRC connection setup complete message through the uplink resource allocated by the base station (S1006).

In the uplink resource allocation method, a UE in an idle mode, which requests connection setup to a base station selected or reselected based on a signal quality or signal strength may know a time required for connection mode switching only when going through the aforementioned random access procedure and RRC connection setup procedure.

In addition, it is inefficient in terms of utilization of radio resources to transmit an uplink resource allocation time to the UE in a unicast scheme.

Therefore, in order to solve the above problem, a method of notifying the uplink resource allocation time to the UE in the idle mode will be described.

Figure 11:
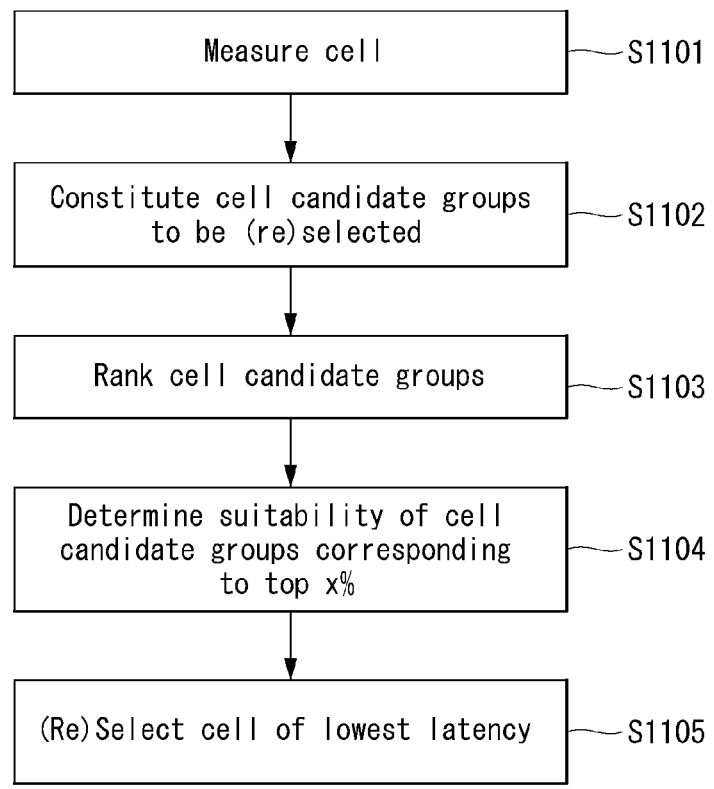
FIG. 11 is a flowchart illustrating one example of a cell reselection method to which the present invention may be applied.

FIG. 11 is a flowchart illustrating one example of a cell selection/reselection method to which the present invention may be applied.

Referring to FIG. 11, the UE may select or reselect cells considering the signal quality and/or signal strength as well as a scheduling delay. That is, the UE in the idle mode predicts the time required for switching to the connection mode for each cell to select or reselect a cell having a short control delay (C-plane) according to state switching.

Specifically, when one or more of the following conditions are fulfilled, the UE in the idle mode measures the selected cell (serving) and the neighboring cell (S1101).

When the signal strength of the already selected cell is equal to or lower than a threshold (for example, $S_{IntraSearchP} \geq Srxlev$, $S_{nonIntraSearchP} \geq Srxlev$)

When the signal quality of the already selected cell is equal to or lower than a threshold (for example, $S_{IntrasearchQ} \geq Squal$, $S_{nonIntraSearchQ} \geq Squal$)

When the scheduling delay of the already selected cell is larger than a maximum allowable delay In this case, the scheduling delay may be constituted by of one or more information defined as below and may be transmitted through a message such as a system information message of a short transmission period.

DL RRC response delay including a processing time for the RRC message transmitted by the UE and a downlink scheduling delay for transmitting a response message Uplink (UL) scheduling delay for the uplink resource grant Whether the UL resource is guaranteed for the UL resource request time of the UE Quantity of available resources (the number of radio blocks (RBs))

In this case, the UL scheduling delay may be defined differently according to each control signal (or message) as shown in Table 6 below or may be defined identically regardless of the control signal.

Table 3 below shows one example of the UL scheduling delay according to each control signal.

TABLE 3

| Control Signal | UL Scheduling Delay |
| --- | --- |
| Random Access | 15 ms |
| Scheduling Request | 10 ms |
| RRC message (e.g., RRC connection request) | 30 ms |

The information associated with the scheduling delay may be expressed as shown in Table 4 below in order to reduce overhead of the eNB according to the system information transmission. The base station (cell) may transmit a profile index to a plurality of UEs as one element of the system information.

TABLE 4

| | | UL Scheduling Delay | | |
| --- | --- | --- | --- | --- |
| Profile Index | DL RRC Response Delay | Random Access | Scheduling Request | RRC message |
| 1 | 5 ms | 10 ms | 5 ms | 5 ms |
| 2 | 10 ms | 15 ms | 10 ms | 10 ms |
| 3 | 15 ms | 20 ms | 15 ms | 15 ms |

In addition, the scheduling delay may be subdivided and defined as follows.

UE type (e.g., Legacy UE, Normal UE, Low latency UE)

UE class (e.g., Access Class)

Table 5 below shows one example of the scheduling delay according to a UE access class.

TABLE 5

| Access Class | DL RRC Response Delay | UL Scheduling Delay |
| --- | --- | --- |
| 11: For PLMN Use | N/A | N/A |
| 12: Security Services | 25 ms | 15 ms |
| 13: Public Utilities (e.g. water/gas suppliers) | 70 ms | 50 ms |
| 14: Emergency Services | 10 ms | 5 ms |
| 15: PLMN Staff | N/A | N/A |
| 16: Mission Critical Services (e.g. Car safety, Remote real-time control) | 10 ms | 10 ms |

UE capability type

Table 6 below is a table showing one example of the scheduling delay defined by considering the processing time which depends on a capability of hardware mounted on the UE.

TABLE 6

| UE capability | | DL RRC Response Delay | UL Scheduling Delay |
| --- | --- | --- | --- |
| Type | Processing delay (ms) | | |
| 00 | 0-4 | 10 ms | 5 ms |
| 01 | 5-9 | 15 ms | 10 ms |
| 10 | 10-14 | 20 ms | 15 ms |
| 11 | 15-19 | 25 ms | 20 ms |

Table 7 below is a table showing an example of the scheduling delay defined in the base station supporting an in-band dual TTI according to whether the UE supports a short TTI.

TABLE 7

| Conventional TTI | | Short TTI | |
|---|---|---|---|
| DL RRC Response Delay | UL Scheduling Delay | DL RRC Response Delay | UL Scheduling Delay |
| 10 ms | 5 ms | 5 ms | 2.5 ms |
| 15 ms | 10 ms | 7 ms | 5 ms |
| 20 ms | 15 ms | 10 ms | 7 ms |
| 25 ms | 20 ms | 12 ms | 10 ms |

The maximum allowable delay means a maximum delay allowed for the control delay (full delay and partial delay) according to the state switching.

The maximum allowable delay is predefined and already held by the UE or may be acquired through a message (e.g., RRC connection release) transmitted by the cell which accesses previously or system information transmitted by the serving cell.

Among the maximum allowable delay values, the value obtained through the system information transmitted by the serving cell may have a higher priority. In this case, the maximum allowable delay value obtained through the system information transmitted by the serving cell may be substituted for only the same type (e.g., same type or access class).

After the cell measurement, the UE may determines whether a cell selection or reselection requirement is fulfilled according to a result value of each cell measured in the cell measurement step and configure a candidate selection or reselection group by using the cells fulfilling the cell selection or reselection requirement (S1102).

Thereafter, the cell candidate group is ranked using the ranking criterion described above (S1103).

The UE that performs the ranking determines the suitability of the cells belonging to a higher group, that is, whether the UE accesses according to the ranking (S1104). The determination criterion for the higher group may be obtained from the serving cell, and the access availability may be obtained from each cell belonging to the higher group.

In this case, the determination criterion for the higher group may be predefined and input in the UE or obtained through the message (e.g., RRC connection release) transmitted by the cell which accesses previously. Herein, the determination criterion for the higher group obtained through the system information transmitted by the already selected cell may have a higher priority.

The determination criterion for the higher group may include at least one of the total number of cells belonging to the higher group, at least one higher group offset, and the like. For example, the UE which receives the system information indicating that the total number of cells belonging to the higher group is 5 may configure the best cell and four next higher cells as the higher group.

The UE receiving the system information including a higher group offset (OffsetbestGroup) may configure the best cell and next higher cells having ranking value equal to or larger than a result value ($R_{BestGroup}$) of Equation 3 below as the higher group.

$$R_{bestGroup} = R_{BestCell} - \text{Offset}_{BestGroup} \quad \text{[Equation 3]}$$

Thereafter, the UE selects or reselects the cell considering the scheduling delay among cells of which suitability is recognized through the suitability determination. In this case, the scheduling delay may be obtained from each suitable cell in the higher group, and the UE selects or reselects the cell through the following method.

Cell selection or reselection with the lowest control delay

Reselection of cell with the largest ranking value guaranteed for the uplink resource allocation time requested by the UE Table 8 below shows one example of estimating the control delay according to state switching (RRC_Idle to RRC_Connected) based on the scheduling delay obtained from three connected cells.

TABLE 8

| Operation | Cell A: Profile index 1 Ranking No. 5 | Cell B: Profile index 2 Ranking No. 2 | Cell C: Profile index 1 Ranking No. 3 |
|---|---|---|---|
| Random Access | 3.5 + 10 ms | 3.5 + 15 ms | 3.5 + 10 ms |
| RRC Connection Request | 6 ms | 6 ms | 6 ms |
| RRC Connection Setup | 5 ms | 10 ms | 5 ms |
| RRC Connection Setup Complete | 15 + 5 ms | 15 + 10 ms | 15 + 5 ms |
| Total operation time | 44.5 ms | 59.5 ms | 44.5 ms |

In the example of Table 8, it is assumed that the scheduling delay is defined as shown in Table 4 and is transmitted by each cell and the transmission time for a random access code and the RRC connection request message and the processing time for the RRC connection setup message are 3.5 ms, 6 ms, and 15 ms, respectively.

According to Table 8, the UE in the idle state will not select the cell B which has a high ranking but takes a long total operation time, and will select the cell C having the higher ranking among the cell A and the cell C having the same delay.

When such a method is selected, the UE in the idle state selects or reselects the cell based on the ranking criterion as well as the scheduling delay, so that the cell having a small delay time may be selected. Accordingly, it is possible to shorten the processing time for transmitting the connection setup message and to prevent the forwarding to another base station.

Further, the uplink resource allocation time of the UE may be calculated by transmitting the scheduling delay by using the broadcast scheme to reduce signaling overhead.

Figure 12:
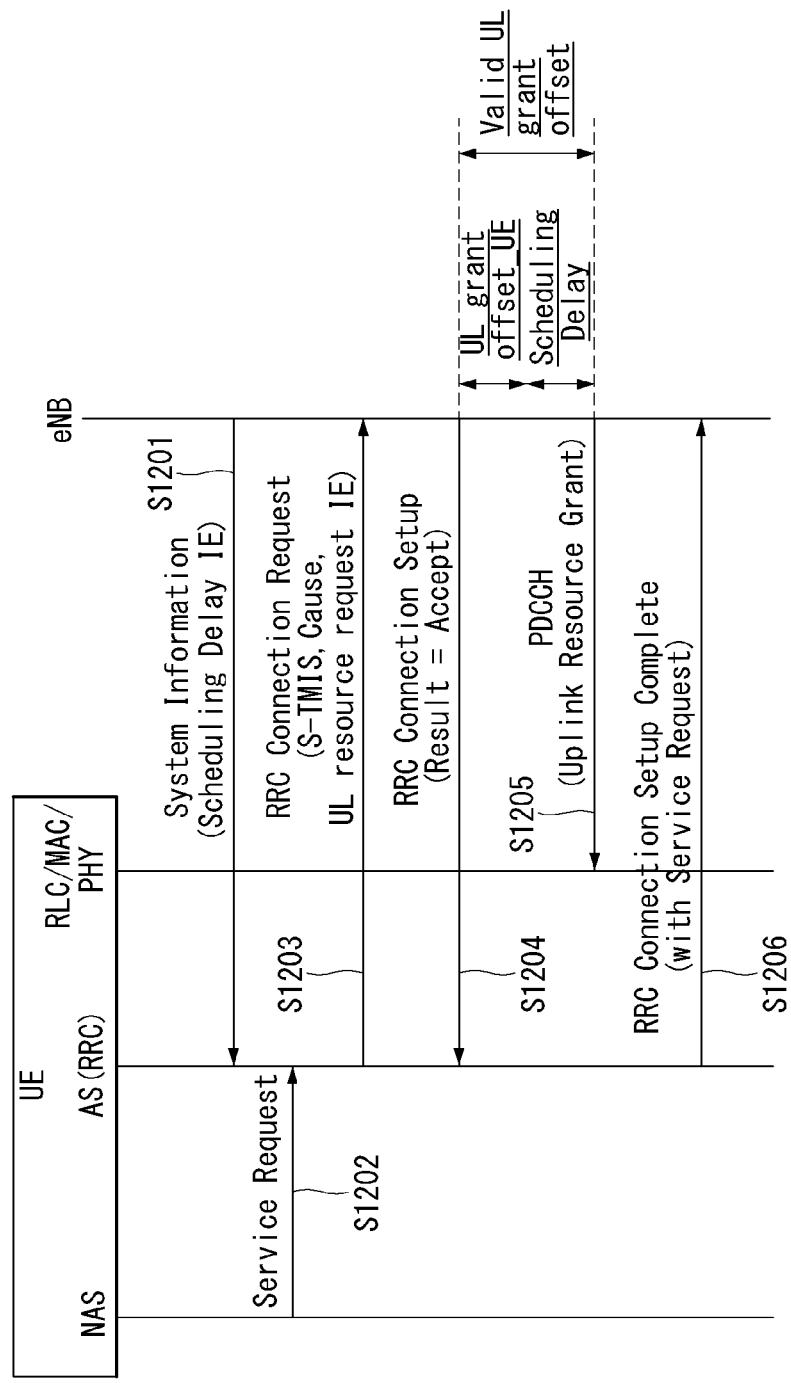
FIG. 12 is a flowchart illustrating another example of the uplink resource allocating method to which the present invention may be applied.

FIG. 12 is a flowchart illustrating another example of the uplink resource allocation method to which the present invention may be applied.

Referring to FIG. 12, in resource allocation for transmission of a response message (for example, RRC connection setup complete) to an RRC message associated with RRC connection (for example, RRC connection setup) by transmitting scheduling delay information, the UE may know a time when the resource is allocated.

Specifically, the UE receives the system information from the eNB (S1201). The system information may be classified into a master information block (MIB) or a system information block (SIB), and the MIB is transmitted through a PBCH and the SIB is transmitted through a PDSCH.

The system information may include the scheduling information (the scheduling delay corresponding to the RRC message) described above.

The detailed description of the system information will be made with reference to the above contents.

Thereafter, the UE transmits the service request to an RRC (or AS) layer from an NAS (in the UE) (S1202).

Thereafter, the UE transmits an RRC connection request message to the base station in order to request the uplink resource grant through RRC connection establishment with the base station (S1203).

The RRC connection request message may include an S-TMIS, a Cause field, a UL resource request information element (resource request IE), and the like.

The Cause field represents information indicating a purpose of transmitting the RRC connection request message.

The Cause field may include information indicating that the RRC connection request message is an uplink resource allocation request for a purpose of a low delay service (e.g., mobile originating urgent or mobile terminating urgent).

The UL resource request IE may include at least one of a UE capability type field indicating a capability of a UE which intends to access the base station, an access class field indicating the access class of the UE, a UL grant offset_UE field indicating a time when the UE requests a UL resource, and an UL grant size field indicating a size of a message or data to be transmitted through the uplink resource.

In addition, the UL resource request IE may further include a device type field indicating a type of the UE.

The UE capability type field may include at least one of Capability Type information of the UE and a Short TTI support indicator indicating whether the UE supports the Short TTI.

Thereafter, the UE receives the RRC connection setup message corresponding to the response to the RRC connection request message from the base station (S1204).

The RRC connection setup message may include a UL resource response IE indicating result information or response information of the uplink resource allocation request of the UE.

When the request of the UE is accepted, the UE receives a request, the UE may know that the uplink resource is allocated to a time (Valid UL grant offset) obtained by adding the scheduling delay (the scheduling delay corresponding to the RRC message) acquired through the system information and a time (a UL grant offset UE) required by the UE.

Thereafter, the UE receives uplink resources at a specific time, for example, a time after the eNB transmits the RRC connection setup message by a Valid UL grant (S1205). In this case, the UE may switch to a short dormant state until a time when uplink resources are allocated.

The UL resource grant may be performed through the PDCCH.

Thereafter, the UE transmits the RRC connection setup complete message through the uplink resource allocated by the base station (S1206).

In such a manner, the UE may predict when the resource is allocated from the base station and switch to the dormant state until the resource is allocated based on the prediction, thereby reducing power consumption.

In addition, the present invention may be applied even to a resource allocation scheme for transmitting a response message (for example, RRC Connection Reconfiguration Complete, RRC Connection Reestablishment Complete, and Security Mode Command Complete) to another RRC message (for example, RRC Connection Reconfiguration, RRC Connection Reestablishment, and security mode command).

FIG. 13 is a flowchart illustrating one example of an RRC connection reestablishment method to which the present invention may be applied.

Referring to FIG. 13, in the RRC connection reestablishment procedure, the UE may know the resource allocation time by transmitting scheduling information.

Specifically, the UE receives the system information from target eNB (S1301). The system information may be classified into a master information block (MIB) or a system information block (SIB), and the MIB is transmitted through a PBCH and the SIB is transmitted through a PDSCH.

The system information may include the scheduling information (the scheduling delay corresponding to the RRC message) described above.

The detailed description of the system information will be made with reference to the above contents.

Thereafter, the UE transmits an RRC connection reestablishment request message to the target eNB in order to request the uplink resource grant through RRC connection reestablishment with the base station (S1302).

The RRC Connection Reestablishment Request message may include a C-RNTI field, a Physical CellID field, a Cause field, and the like.

The Cause field represents information indicating a purpose of transmitting the RRC connection request message.

The Cause field may include information indicating that the RRC connection request message is an uplink resource allocation request for a purpose of a low delay service (e.g., mobile originating urgent or mobile terminating urgent).

Thereafter, the target eNB transmits a UE Context Request in order to request information on the UE to source eNB to which the UE connects previously using the UE identifiers (C-RNTI and physical CellID) (S1303).

The Source eNB transmits a UE Context Response to the target eNB in response to the request (S1304).

The UE Context Response message may include a UE capability IE including the information on the UE.

The UL capability IE may include at least one of a UE capability type field indicating a capability of a UE which intends to access the base station, an access class field indicating the access class of the UE, a UL grant offset_UE field indicating a time when the UE requests a UL resource, and an UL grant size field indicating a size of a message or data to be transmitted through the uplink resource.

In addition, the UL resource request IE may further include a device type field indicating a type of the UE.

The UE capability type field may include at least one of Capability Type information of the UE and a Short TTI support indicator indicating whether the UE supports the Short TTI.

Thereafter, the target eNB may transmit an RRC Connection Reestablishment message including whether to allocate the uplink resource to the UE in an unsolicited manner (e.g., using an Unsolicited UL Resource Allocation Indicator) (S1305).

When the Unsolicited UL Resource Allocation Indicator is 1, the UE may know that the uplink resource will be allocated and the UE may know that the uplink resource is to be allocated at a time (Valid UL grant offset) obtained by adding the scheduling delay obtained through the system information and the time (UL grant offset_UE) requested by the UE during the connection establishment process with the Source eNB.

Thereafter, the UE receives uplink resources at a specific time, for example, a time after the target eNB transmits the RRC connection reestablishment message by a Valid UL grant (S1306).

In this case, the UE may switch to a short dormant state until a time when uplink resources are allocated.

The UL resource grant may be performed through the PDCCH.

Thereafter, the UE transmits the RRC connection setup complete message to the target eNB through the uplink resource allocated by the base station (S1307).

In such a manner, the UE may predict when the resource is allocated from the base station and switch to the dormant state until the resource is allocated based on the prediction, thereby reducing power consumption.

Figure 14A:
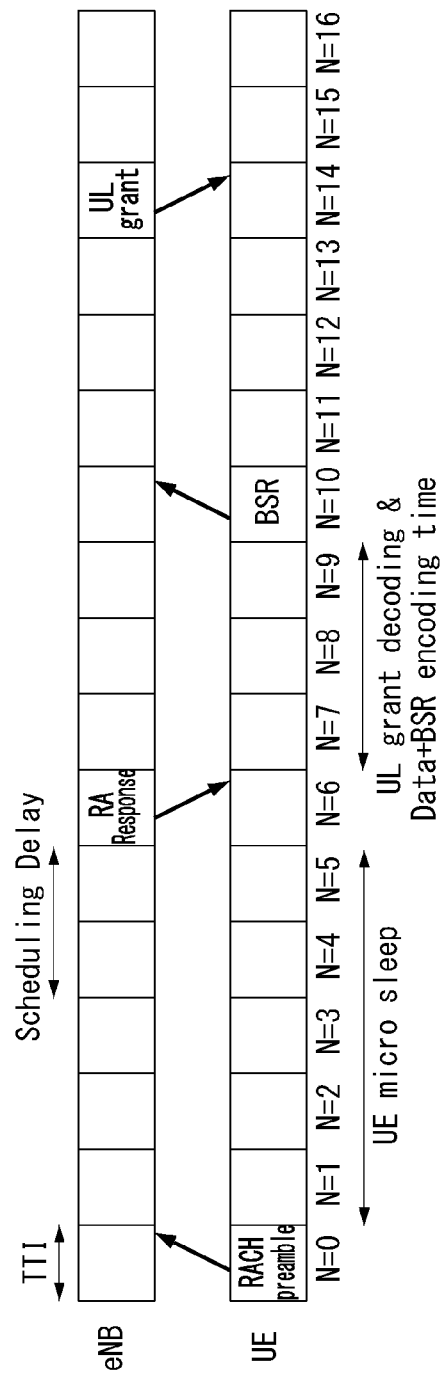

FIGS. 14a and 14b are diagrams illustrating one example of an uplink resource allocating method to which the present invention may be applied.

FIG. 14a illustrates the uplink resource grant when a predetermined UE performs random access and it may be verified that a scheduling delay of 2 ms occurs.

The UE may receive the scheduling delay value from the base station and know the uplink resource allocation time using the received scheduling delay value and the time requested by the UE.

As described in FIG. 12, the UE may verify that the UE switches to the short dormant state until the time when the uplink resource is allocated.

FIG. 14b illustrates the uplink resource allocation for the scheduling request of a specific UE and similarly to FIG. 14a, the UE may verify that the UE switches to the dormant state until the uplink resource is allocated.

Figure 15:
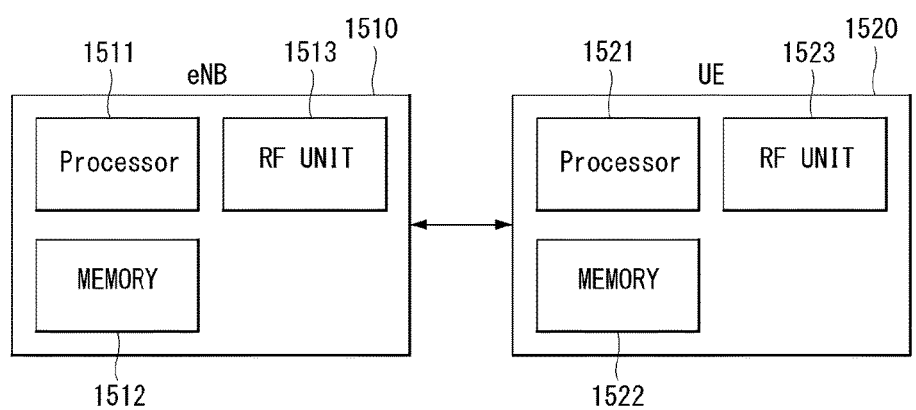
FIG. 15 is a diagram illustrating one example of an internal block diagram to which the present invention may be applied.

FIG. 15 is a diagram illustrating one example of an internal block diagram of a wireless apparatus to which the present invention may be applied.

Herein, the wireless apparatus may be a base station or a UE and the base station includes both a macro base station and a small base station.

As illustrated in FIG. 15, the base station 1510 and the UE 1520 include communication units (a transceiving unit and an RF unit 1513 and 1523), processors 1511 and 1521, and memories 1512 and 1522.

Besides, the base station and the UE may further include an input unit and an output unit.

The communication units 1513 and 1523, the processors 1511 and 1521, the input unit, the output unit, and the memories 1512 and 1522 are functionally connected to perform the method proposed in the present specification.

Upon receiving information generated from a PHY protocol layer, the communication units (the transceiving unit and the RF unit) 1513 and 1523 move the received information to a radio-frequency (RF) spectrum and performs filtering, amplification, and the like and transmits the information to an antenna. Further the communication unit performs a function to move a radio frequency RF) signal received by the antenna to a band that may be processed by a PHY protocol and perform filtering.

In addition, the communication unit may also include a switch function for switching transmission and reception functions.

The processors 1511 and 1521 implement a function, a process, and/or a method which are proposed in the present specification. Layers of a radio interface protocol may be implemented by the processor.

The processor may be expressed as a control section, a controller, a control unit, a computer, and the like.

The memories 1512 and 1522 are connected with the processor to store a protocol or a parameter for performing the uplink resource allocation method.

The processors 1511 and 1521 may include an application-specific integrated circuit (ASIC), another chipset, a logic circuit, and/or a data processing apparatus. The memory may include a read-only memory (ROM), a random access memory (RAM), a flash memory, a memory card, a storage medium, and/or other storage devices. The communication unit may include a baseband circuit for processing the radio signal. When the embodiment is implemented by software, the aforementioned technique may be implemented by a module (a process, a function, and the like) that performs the aforementioned function.

The module may be stored in the memory and executed by the processor. The memory may be positioned inside or outside the processor and connected with the processor by various well-known means.

An output unit (display section or display unit) is controlled by the processor, and outputs information output from the processor together with a key input signal generated by a key input unit various information signals from the processor.

Furthermore, although the drawings have been described for the sake of convenience of explanation, it is also possible to design a new embodiment to be implemented by merging the embodiments described in each drawing. It is also within the scope of the present invention to design a computer-readable recording medium in which a program for executing the previously described embodiments is recorded according to the needs of those skilled in the art.

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

Meanwhile, the uplink resource allocation method of the present specification may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet.

Further, the processor readable recording media may be stored and executed as codes which may be distributed in the computer system connected through a network and read by the processor in a distribution method.

INDUSTRIAL APPLICABILITY

In a wireless communication system of the present invention, an example in which a method for cell selection or reselection is applied to a 3GPP LTE/LTE-A system is primarily described, but can be applied to various wireless communication systems in addition to the 3GPP LTE/LTE-A system.

The invention claimed is:

1. A method for allocating an uplink (UL) resource in a wireless communication system supporting a low latency service, the method performed by a user equipment (UE) and comprising:
receiving a first control message including first scheduling delay information indicating a delay time related to resource allocation of a serving base station from the serving base station;
transmitting a request message including a UL resource request information element (IE) for requesting UL resource allocation to the serving base station or a neighboring base station based on the first control message; and receiving a response message in response to the request message from the serving base station or the neighboring base station, wherein the UL resource is allocated to the UE by the serving base station or the neighboring base station based on the request message, and wherein the UL resource request IE includes a UL grant offset field indicating a UL resource request time of the UE.

2. The method of claim 1, wherein the first scheduling delay information includes at least one of downlink radio resource control (RRC) response delay information indicating a message processing time and a delay time for the response message, UL scheduling delay information indicating the delay time for UL resource allocation, UL resource guarantee information indicating guarantee for the UL resource request time, or an available resource amount information.

3. The method of claim 2, wherein when the UL resource is allocated from the serving base station, the UL resource is allocated after a time obtained by adding a value of the UL scheduling delay information and a value of the UL grant offset field elapsed from a time of receiving the response message.

4. The method of claim 1, further comprising receiving a second control message including second scheduling information indicating a delay time related to resource allocation of neighboring base stations from the neighboring base stations, when the serving base station satisfies a specific condition, wherein the first control message further includes maximum allowable delay information indicating a maximum delay value allowed by the UE for a radio resource control (RRC) connection with the serving base station.

5. The method of claim 4, further comprising:

measuring quality values of the neighboring base stations;

determining rankings of the neighboring base stations based on the measured quality values; and determining some neighboring base stations among the neighboring base stations as a higher group based on the determined rankings.

6. The method of claim 5, further comprising:

selecting the neighboring base station to be a next serving base station based on the second scheduling delay information and the rankings among the some neighboring base stations included in the higher group, wherein the second scheduling delay information includes a delay time with state transition from an idle mode to a connected mode.

7. The method of claim 6, wherein the UL resource is allocated at a time obtained by adding a value of the second scheduling delay information and a value of the UL grant offset field.

8. The method of claim 6, wherein each of the first scheduling delay information and the second scheduling delay information varies depending on a type of the UE, a kind of the UE, or a capability of the UE.

9. The method of claim 5, wherein a quality value is at least one of a signal strength or a signal quality of the neighboring cells.

10. The method of claim 5, wherein the higher group includes a cell having a best ranking to a cell having a ranking value obtained by subtracting a specific offset value from the best ranking.

11. The method of claim 4, wherein the specific condition is at least one of a case where a signal strength of the serving base station is equal to or smaller than a threshold, a case where a signal quality of the base station is equal to or lower than a threshold, or a case where the first scheduling delay information is larger than the maximum allowable delay information.

12. The method of claim 4, wherein when the serving base station does not fulfill the specific condition, the serving base station is selected.

13. The method of claim 1, wherein the UL resource request IE further includes at least one of a cause field indicating a UL resource request for a low delay service, a UE capability type field indicating a capability of the UE accessing the serving base station, a UL grant size field indicating a size of data to be transmitted through the UL resource, or a device type field indicating a type of the UE.

14. The method of claim 1, wherein the UE is in an idle state from a time of receiving the response message up to a time of receiving the UL resource.

15. A user equipment (UE) for selecting a cell in a wireless communication system supporting a low latency service, the UE comprising:

a transceiver configured to transmit and receive a radio signal; and a processor functionally coupled with the transceiver, wherein the processor is configured to:

control the transceiver to receive a first control message including first scheduling delay information indicating a delay time related to resource allocation of a serving base station from the serving base station, control the transceiver to transmit a request message including an uplink (UL) resource request information element (IE) for requesting UL resource allocation to the serving base station or a neighboring base station, and control the transceiver to receive a response message in response to the request message from the serving base station or the neighboring base station, wherein the UL resource is allocated to the UE by the serving base station or the neighboring base station based on the request message, and wherein the UL resource request information IE includes a UL grant offset field indicating a UL resource request time of the UE.

* * * * *